United States Patent [19]

Schütz et al.

[11] Patent Number: 4,813,972
[45] Date of Patent: Mar. 21, 1989

[54] FIBER-REACTIVE CHROMIUM COMPLEXES AND THEIR PREPARATION AND USE FOR POLYAMIDE, LEATHER AND COTTON

[75] Inventors: Hans U. Schütz, Basel, Switzerland; Ulrich Schlesinger, Binzen; Gerhard Back, Lörrach, both of Fed. Rep. of Germany

[73] Assignee: Ciba-Geigy Corporation, Ardsley, N.Y.

[21] Appl. No.: 105,344

[22] Filed: Oct. 7, 1987

Related U.S. Application Data

[60] Division of Ser. No. 888,281, Jul. 24, 1986, Pat. No. 4,723,001, which is a continuation of Ser. No. 668,552, Nov. 2, 1984, abandoned.

[30] Foreign Application Priority Data

Nov. 4, 1983 [CH] Switzerland ............... 5966/83

[51] Int. Cl.$^4$ .................. C09B 62/01; D06P 1/38; D06P 3/10
[52] U.S. Cl. ............................. 8/599; 8/437; 8/549; 8/594; 8/673; 8/685; 8/917; 8/918; 8/924; 534/619; 534/598
[58] Field of Search ............ 8/599, 673, 685

[56] References Cited

U.S. PATENT DOCUMENTS

| | | | |
|---|---|---|---|
| 3,356,671 | 12/1967 | Johnson et al. | 8/437 |
| 3,538,073 | 11/1970 | Mack et al. | 534/624 |
| 3,878,158 | 4/1975 | Brouard et al. | 534/619 X |
| 4,008,211 | 2/1977 | Lienhard et al. | 8/685 |
| 4,012,369 | 3/1977 | Brouard et al. | 534/619 X |
| 4,019,857 | 4/1977 | Breda | 534/619 X |
| 4,045,423 | 8/1977 | Brouard et al. | 534/619 X |
| 4,123,429 | 10/1978 | Brouard et al. | 534/619 X |
| 4,218,367 | 8/1980 | Brouard et al. | 534/619 X |
| 4,678,851 | 7/1987 | Back et al. | 534/619 |
| 4,680,385 | 7/1987 | Back | 534/695 |

FOREIGN PATENT DOCUMENTS

| | | | |
|---|---|---|---|
| 144776 | 6/1985 | European Pat. Off. | 534/622 |
| 2034315 | 12/1970 | France . | |
| 793903 | 4/1958 | United Kingdom . | |
| 949960 | 2/1964 | United Kingdom | 534/622 |
| 1271226 | 4/1971 | United Kingdom | 534/635 |
| 1427904 | 3/1976 | United Kingdom . | |

*Primary Examiner*—A. Lionel Clingman
*Attorney, Agent, or Firm*—Wenderoth, Lind & Ponack

[57] ABSTRACT

The invention relates to chromium complexes of the formula

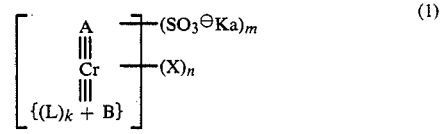

in which A is the radical of a dicyclically metallizable azo or azomethine dye, B is the radical of a potentially at least bidentate bianionic complexible organic compound which contains no azo or azomethine group, L is a colorless monofunctional ligand, X is a fibre-reactive radical, Ka is a cation, K is 0 or 1, m is 1, 2 or 3, n is 1 or 2, and the X radical and the $SO_3^\ominus Ka$ group are each bonded to the radicals A and B, to a process for preparing the chromium complexes of the formula (1), and to a combined preparation and dyeing process.

9 Claims, No Drawings

FIBER-REACTIVE CHROMIUM COMPLEXES AND THEIR PREPARATION AND USE FOR POLYAMIDE, LEATHER AND COTTON

This application is a division of application Ser. No. 888,281, filed July 24, 1986, now U.S. Pat. No. 4,723,001, which application is in turn a continuation of application Ser. No. 668,552, filed Nov. 2, 1984 (now abandoned).

Metal complex dyes have been known for a long time and are widely used for dyeing and printing fibrous textile materials in all manner of shades. In view of the even higher demands on these dyes, for example in relation to the levelness of the dyeings and the fastness level, the current state of the art is frequently not fully satisfactory. For instance, many existing 1:2 metal complex azo or azomethine dyes do not meet presentday demands on the levelness of the dyeings owing to lack of diffusion of the dyes in the fibre; most of the existing 1:1 metal complex azo or azomethine dyes have the disadvantage that they need to be dyed at a strongly acid pH at which some fibre materials can be damaged.

It is the object of the present invention to provide novel metal complex azo or azomethine dyes which are readily accessible and easily applied to produce dyeings which are level and also have good all-around fastness properties, in particular wet fastness properties, which meet presentday demands. It was found that this object is achieved with the novel chromium complex dyes defined hereinafter.

The present invention accordingly provides chromium complex dyes of the formula

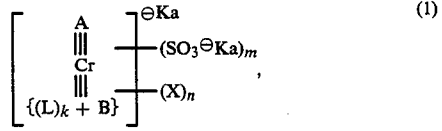

in which A is the radical of a dicyclically metallisable azo or azomethine dye, B is the radical of a potentially at least bidentate, bianionic complexible organic compound which contains no azo or azomethine group, L is a colourless monofunctional ligand, X is a fibre-reactive radical, Ka is a cation, k is 0 or 1, m is 1, 2 or 3, n is 1 or 2, and the radical X and the $SO_3^{\ominus}Ka$ group are each bonded to the radical A and/or B.

The novel chromium complexes of the formula (1) are anionic. A potentially at least bidentate complexible organic compound, the radical B participates in the chromium complex with two covalent bonds and in some cases a coordinate bond. As the chromium complexes of the formula (1) activate a maximum coordination number of 6, the complexes, depending on the nature and bonding of the radical B, can also contain a monofunctional ligand L where free electron pairs of the donor atoms are involved in the bonding. In terms of the generally customary and clear notation for metal complexes, chromium complexes of the formula (1), leaving—$SO_3^{\ominus}Ka$ and X substituents out of consideration, can have the following formula:

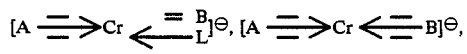

where a solid line symbolises the covalent bond and an arrow symbolises the bonding of free electron pairs of the donor atoms.

The azo or azomethine dye radical A in the formula (1), in addition to the complexing groups, can contain the customary substituents which occur in dyes, for example alkyl groups having 1 to 5 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino and propionylamino, benzoylamino, amino, monoalkylamino or dialkylamino each having 1 to 4 carbon atoms in the alkyl radical, phenylamino, alkoxycarbonyl having 1 to 4 carbon atoms in the alkoxy radical, nitro, cyano, trifluoromethyl, halogen, such as fluorine, chlorine and bromine, sulfamoyl, carbamoyl, ureido, hydroxyl, $C_{1-4}$-alkylsulfonyl, for example methylsulfonyl, carboxyl, sulfomethyl and sulfo, plus one or two fibre-reactive radicals X and arylazo groups, for example a phenylazo or naphthylazo group.

An azo or azomethine dye radical A can be in particular a radical of the formula

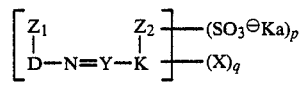

in which D is the radical of a diazo component of the benzene or naphthalene series, Y is a nitrogen atom or a CH group, K, in the event that Y is a nitrogen atom, is the radical of a coupling component, in particular of the benzene or naphthalene series or of the heterocyclic series, or in the even that Y is a CH group is the radical of an o-hydroxyaldehyde, $Z_1$, which is in the o-position relative to the —N═Y— radical, is a —O— or —COO— group, and $Z_2$ is a —O— or —N(R)— group where R is hydrogen, substituted or unsubstituted $C_{1-4}$-alkyl, for example, methyl, ethyl, $\beta$-hydroxyethyl, isopropyl, n-propyl, sec.-butyl, isobutyl, tert.-butyl or n-butyl, or substituted or unsubstituted phenyl, and $Z_2$ is bonded to K in the adjacent position to the —N═Y— radical, Ka and X are as defined under the formula (1), p is 0, 1, 2, or 3 and q is 0, 1 or 2, and if p is 0 the B radical contains at least one $SO_3^{\ominus}Ka$ group and if q is 0 at least one fibre-reactive radical X.

Of the large number of possible, potentially at least bidentate, bianionic complexible organic compounds which contain the B radical preference is given to the chelating agents which combine with the chromium via two covalent and possibly one coordinate bond to form one or two rings, in particular 5- or 6-membered rings.

In particularly preferred compounds, B is a potentially bidentate bianionic complexible organic compound of the benzene, naphthalene or heterocyclic series or of the aliphatic series and can contain 1 or 2 sulfonic acid groups and a fibre-reactive radical X.

B is in particular a radical of the o-hydroxybenzoic acid, 8-carboxy-1-naphthol, phthalic acid or pyrocatechol series or a radical of the formulae

HOOC—$R_1$—COOH,

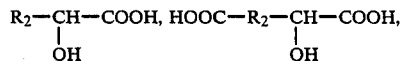

-continued

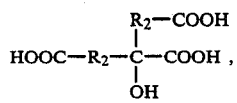

where $R_1$ is a direct bond, $C_{1-2}$-alkylene, such as methylene or ethylene, or —CH=CH—, $R_2$ is $C_{1-4}$-alkyl, such as methyl, ethyl, isopropyl, propyl, sec.-butyl, isobutyl, tert.-butyl or n-butyl, and the radicals $R_1$ and $R_2$ can be further substituted, for examle by halogen, such as fluorine, chlorine or bromine, or $C_{1-4}$-alkoxy, such as methoxy or ethoxy.

In very particularly preferred compounds, B is the radical of oxalic acid.

The monofunctional ligand L in the formula (1) predominantly is $H_2O$, $NH_3$, $R_2$—OH, $R_2$—$NH_2$, $(R_2)_2NH$, $(R_2)_3N$ or pyridine, where $R_2$ is as defined above.

The fibre-reactive radical X in the formula (1) is to be understood as meaning acyl radicals which have in the molecule one or more reactive groups or detachable substituents which are capable of reacting, for example, with cellulose materials, specifically with the hydroxyl groups of the cellulose, in the presence of acid-binding agents and with or without the action of heat or with synthetic or natural polyamide fibres, for example wool, specifically with the $NH_2$ groups of these fibres, to form covalent bonds. Many such fibre-reactive groups are described in the literature.

X preferably is a fibre-reactive radical of the aliphatic or heterocyclic series which is bonded to the azo or azomethine dye radical A and/or to the radical B either directly or via a bridge member.

X is preferably bonded to the radical A and/or B via an amino group which can be monoalkylated, for example —NH—, —N(CH$_3$)—, —N(C$_2$H$_5$)— or —N(C$_3$H$_7$)—, or via a bridge member containing an amino group.

Specific examples of monohalogenated or dihalogenated symmetrical triazinyl radicals are 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-β-oxyethylamino-4-chlorotriazin-6-yl, 2-di-β-oxyethylamino-4-chlorotriazin-6-yl and the corresponding sulfuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted 2-arylamino-4-chlorotriazin-6-yl, such as 2-phenylamino-4-chlorotriazin-6-yl, 2-(o-, m- or p-carboxy- or -sulfophenyl)-amino-4-chlorotriazin-6-yl, 2-alkoxy-4-chlorotriazin-6-yl, such as 2-methoxy- or 2-ethoxy-4-chlorotriazin-6-yl, 2-cyclohexyloxy-4-chlorotriazin-6-yl, 2-(phenylsulfonyl)-methoxy-4-chlorotriazin-6-yl, 2-aryloxy- and substituted 2-aryloxy-4-chlorotriazin-6-yl, such as 2-phenoxy-4-chlorotriazin-6-yl, 2-(p-sulfophenyl)-oxy-4-chlorotriazin-6-yl, 2-(o-, m- or p-methyl- or -methoxyphenyl)-oxy-4-chlorotriazin-6-yl, 2-alkylmercapto- or 2-arylmercapto-4-chlorotriazin-6-yl, such as 2-β-hydroxyethylmercapto-4-chlorotriazin-6-yl, 2-phenylmercapto-4-chlorotriazin-6-yl, 2-(4'-methylphenyl)-mercapto-4-chlorotriazin-6-yl, 2-(2',4'-dinitro)-phenylmercapto-4-chlorotriazin-6-yl, 2-methyl-4-chlorotriazin-6-yl, 2-phenyl-4-chlorotriazin-6-yl and the 2-methoxy-4-fluorotriazin-6-yl radical.

Of particular interest as fibre-reactive radicals are fluoro-1,3,5-triazine radicals of the formula

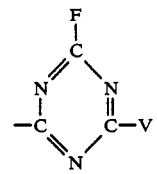

where particular examples of the substituent V on the triazine ring are: radicals of primary, secondary and tertiary amines, such as —NH$_2$, —NHC$_2$H$_5$, —N(C$_2$H$_5$)$_2$, —NH—CH(CH$_3$)$_2$,— —NHC$_2$H$_4$OH, —N(C$_2$H$_4$OH)$_2$, morpholino, piperidino, N-phenylamino, N-(2-, 3- or 4-sulfophenyl)-amino, N-toluidino, N-(2,4- or 2,5-disulfophenyl)-amino and N-(γ-methoxypropyl)amino, and $C_{1-4}$-alkoxy radicals, such as methoxy, ethoxy, isopropoxy, propoxy or phenoxy.

Also of interest are reactive radicals which have the following formula

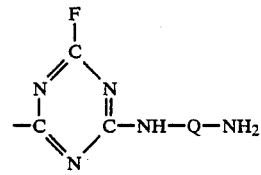

in which Q is an aliphatic or aromaic bridge member. Radicals of this type can be further substituted with 2,4,6-trifluoro-1,3,5-triazine to form a radical of the formula

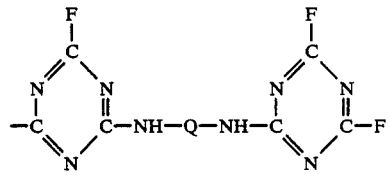

and this radical can finally be reacted with an amine. Examples of suitable amines of this type are ammonia, methylamine, ethylamine, dimethylamine, diethylamine, ethanolamine, diethanolamine, morpholine, piperidine, 2-, 3- or 4-aminotoluene, metanilic acid, sulfanilic acid, aniline, N-methylaniline, 4-aminobenzylsulfonic acid, 2-, 3- or 4-aminobenzoic acid, naphthylaminomonosulfonic, naphthylaminodisulfonic and naphthylaminotrisulfonic acids and also amino-containing dyes.

Examples of suitable diamines which introduce the radical of the formula —HN—Q—$NH_2$ are: ethylenediamine, 1,3-diaminopropane, 1,6-diaminohexane, 1,3- and 1,4-phenylenediamine, 1,3-phenylenediamine-4-sulfonic acid, 1,4-phenylenediamine-2-sulfonic acid, 2,4-diaminotoluene, 4,4'-diaminodiphenyl-2,2'-disulfonic acid, 4,4'-diaminodiphenylurea-2,2'-disulfonic acid, 2,5-diaminonaphthalene-4,8-disulfonic acid, 4,4'-diaminodiphenyl ether and 2,5-diaminobenzoic acid.

Others of interest are monohalogenopyrimidinyl, dihalogenopyrimidinyl and trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-monochloromethyl- or -5-dichloromethyl- or -5-trichloromethyl- or -5-carbalkoxy-pyrimidin-6-yl, 2,6-dichloropyrimidine-4-carbonyl, 2,4-dichloropyrimidine-5-carbonyl, 2-chloro-4-methyl-pyrimidine-5-carbonyl, 2methyl-4-chloropyrimidine-5-carbonyl, 2-methylthio-4-fluoropyrimidine-5-carbonyl, 6-methyl-2,4-dichloropyrimidine-4-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-sulfonyl, 1,4-dichlorophthalazine-6-sulfonyl or -6-carbonyl, 2,4-dichloroquinazol-7-ine or -6-sulfonyl or -carbonyl, 2- or 3- or 4-(4',5'-dichloropyridaz-6'-on-1'-yl)phenylsulfonyl or -carbonyl, β-(4',5'-dichloropyridaz-6'-on-1'-yl)-ethylcarbonyl, N-methyl-N'-(2,4-dichlorotriazin-6-yl)carbamyl, N-methyl-N-(2-methylamino-4-chlorotriazin-6-yl)carbamyl, N-methyl-N-(2-dimethylamino-4-chlorotriazin-6-yl)carbamyl, N-methyl- or N-ethyl-N-(2,4-dichlorotriazin-6-yl)aminoacetyl, N-methyl-N-(2,3-dichloroquinoxaline-6-sulfonyl-)aminoacetyl, N-methyl-N-(2,3-dichloroquinoxaline-6-carbonyl)aminoacetyl, and the corresponding bromine or fluorine derivatives of the abovementioned chlorine-substituted heterocyclic radicals; among these for example 2-fluoro-4-pyrimidinyl, 2,-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-chloro-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimdinyl, 2,6-difluoro-5-trifluoromethyl-4-pyrimidinyl; sulfonyl-containing triazine radicals, such as 2,4-bis-(phenylsulfonyl)-triazin-6-yl, 2-(3'-carboxyphenyl)-sulfonyl-4-chlorotriazin-6-yl, 2-(3'-sulfophenyl)-sulfonyl-4-chlorotriazin-6-yl, 2,4-bis-(3'-carboxyphenylsulfonyl)-triazin-6-yl; sulfonyl-containing pyrimidine rings, such as 2-carboxymethylsulfonyl-pyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidin-4-yl, 2,6-bis-methylsulfonyl-pyrimidin-4-yl, 2,6-bis-methylsulfonyl-5-chloro-pyrimidin-4-yl, 2,4-bis-methylsulfonyl-pyrimidin-5-yl-sulfonyl, 2-methylsulfonyl-pyrimidin-4-yl, 2-phenylsulfonyl-pyrimidin-4-yl, 2-trichloromethylsulfonyl-6-methyl-pyrimidin-4-yl, 2-methylsulfonyl-5-chloro-6-methyl-pyrimidin-4-yl, 2-methylsulfonyl-5-bromo-6-methyl-pyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methyl-pyrimidine-5-sulfonyl, 2-methylsulfonyl-5-nitro-6-methyl-pyrimidin-4-yl, 2,5,6-tris-methylsulfonyl-pyrimidin-4-yl, 2-methylsulfonyl-5,6-dimethyl-pyrimidin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carboxy-pyrimidin-4-yl, 2-methylsulfonyl-5-sulfo-pyrimidin-4-yl, 2-methylsulfonyl-6-carbomethoxy-pyrimidin-4-yl, 2-methylsulfonyl-5-carboxy-pyrimidin-4-yl, 2-methylsulfonyl-5-cyano-6-methoxy-pyrimidin-4-yl, 2-methylsulfonyl-5-chloro-pyrimidin-4-yl, 2-sulfoethylsulfonyl-6-methyl-pyrimidin-4-yl, 2-methylsulfonyl-5-bromo-pyrimidin-4-yl, 2-phenylsulfonyl-5-chloro-pyrimidin-4-yl, 2-carboxymethylsulfonyl-5-chloro-6-methyl-pyrimidin-4-yl, 2-methylsulfonyl-6-chloropyrimidin-4yl and -5-carbonyl, 2,6-bis(methylsulfonyl)-pyrimidine-4- or -5-carbonyl, 2-ethylsulfonyl-6-chloropyrimidine-5-carbonyl, 2,4-bis-(methylsulfonyl)pyrimidine-5-sulfonyl, 2-methylsulfonyl-4-chloro-6-methyl-pyrimidine-5-sulfonyl or -carbonyl; ammonium-containing triazine rings, such as 2-trimethylammonium-4-phenylamino- or -4- (o-, m- or p-sulfophenyl)-amino-triazin-6-yl, 2-(1,1-dimethylhydrazinium)-4-phenylamino- or -4-(o-, m- or p-sulfophenyl)aminotrazin-6-yl, 2-(2-isopropylidine-1,1-dimethyl)-hydrazinium-4-phenylamino- or -4-(o-, m- or p-sulfophenyl)-aminotriazin-6-yl, 2-N-aminopyrrolidinium- or 2-N-aminopiperidinium-4-phenylamino- or -4-(o-, m- or p-sulfophenyl)-aminotriazin-6yl, and also 4-phenylamino- or 4-(sulfophenylamino)triazin-6-yl radicals which, in the 2-position, contain 1,4-bis-azabicyclo[2.2.2]octane or 1,2-bis-azabicyclo[0.3.3]-octane via a quaternary nitrogen bond, 2-pyridinium-4-phenylamino- or -4-(o-, m- or p-sulfophenyl)-aminotriazin-6-yl and corresponding 2-oniumtriazin-6-yl radicals which are substituted in the 4-position by alkylamino, such as methylamino, ethylamino or β-hydroxyethylamino, or alkoxy, such as methoxy or ethoxy, or aryloxy, such as phenoxy, or sulfophenoxy groups; 2-chlorobenzothiazole-5- or -6-carbonyl or -5- or -6-sulfonyl, 2-arylsulfonyl or -alkylsulfonylbenzotriazole-5- or -6-carbonyl or -5- or -6-sulfonyl, such as 2-methylsulfonyl- or 2-ethylsulfonyl-benzothiazole-5- or -6-sulfonyl or -carbonyl, and the corresponding 2-sulfonylbenzothiazole-5- or -6-carbonyl or -6-sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl, and the N oxide of 4-chloroquinoline or 4-nitroquinoline-5-carbonyl.

Further examples are reactive groups of the aliphatic series such as monochloroacryloyl, dichloroacryloyl or trichloroacryloyl radicals or monobromoacryloyl or dibromoacryloyl radicals, such as α,β-dibromopropionyl, —CO—CH=CH—Cl, —COCCl=CH$_2$, —CO—CCl=CH—CH$_3$, and also —CO—CCl=CH—COOH, —CO—CH=CCl—COOH, β-chloropropionyl, 3-phenylsulfonylpropionyl, 3-methylsulfonylpropionyl, β-sulfatoethylaminosulfonyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1-carbonyl, 2,2,3,3-tetrafluorocyclobutanecarbon-1-yl or -sulfon-1-yl, β-(2,2,3,3-tetrafluorocyclobut-1-yl)acryloyl, α- or β-bromoacryloyl, the α- or β-alkylsulfonyl or -arylsulfonyl-acryloyl group, such as α- or β-methylsulfonylacryloyl.

The cation Ka in the formula (1) is a hydrogen, sodium, potassium, lithium or ammonium ion or the cation of an organic amine, for example of triethanolamine.

Particularly preferred chromium complexes have the formula

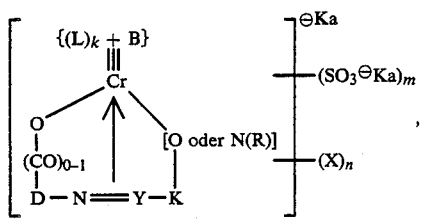

in which B is the radical of a potentially at least bidentate bianionic complexible organic compound of the benzene, naphthalene or heterocyclic series or the aliphatic series, L is a colourless monofunctional ligand, D is the radical of a diazo component of the benzene or naphthalene series which contains the $-(CO)_{\overline{0-1}}O-$ group in the o-position relative to the $-N=Y-$ group, Y is a nitrogen atom or a $-CH$ group, K, in the event that Y is a nitrogen atom, is the radical of a coupling component of the benzene or naphthalene series or of the 5-pyrazolone, 5-aminopyrazole, acetoacetarylide, quinoline or benzoylacetoacrylide series which contains the $-[O$ or $N(R)]-$ radical adjacent to the azo bridge and R is hydrogen, substituted or unsubstituted $C_{1-4}$-alkyl or substituted or unsubstituted phenyl, or, in the event that Y is a CH group, K is the radical of an o-hydroxybenzaldehyde or o-hydroxynaphthaldehyde, and X is a fibre-reactive radical of the aliphatic or heterocyclic series which is bonded to D and/or K and/or B either directly or via a bridge member, Ka is a cation, k is 0 or 1, m is 1, 2 or 3 and n is 1 or 2, and the $SO_3^{\ominus}Ka$ group is bonded to D and/or K and/or B.

Y is in particular a nitrogen atom.

X is in particular an acryloyl, monohalogenoacryloyl, dihalogenoacryloyl, trihalogenoacryloyl, monohalogenomethacryloyl, dihalogenomethacryloyl, trihalogenomethacryloyl, monohalogenopropionyl, dihalogenopropionyl, phenylsulfonylpropionyl, methylsulfonylpropionyl, vinylsulfonyl, β-chloroethylsulfonyl or β-sulfatoethylsulfonyl radical or a radical of the monohalogenopyrimidyl, dihalogenopyrimidyl or trihalogenopyrimidyl or monohalogenotriazinyl or dihalogenotriazinyl series, and can be bonded to D and/or K and/or B via a bridge member of the formula

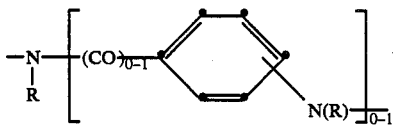

or

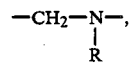

and R is as defined under the formula (3). X is especially an α,β-dibromopropionyl or α-bromoacryloyl radical which is bonded to D and/or K and/or B via an amino group.

Very particularly preferred chromium complexes have the formula (3) in which B is the radical of oxalic acid, malonic acid, citric acid, malic acid, tartaric acid, pyrocatechol, phthalic acid, lactic acid, salicylic acid, sulfosalicylic acid or salicylic acid which is substituted by one or two radicals X and can be substituted by sulfo or acetylamino, a colourless monofunctional ligand L is water, D is a benzene radical which, in addition to being substituted by the metallisable group, can also be additionally substituted by sulfo, nitro, halogen, sulfamoyl, methoxy and the radical X, or is a naphthalene radical which, in addition to being substituted by a metallisable group, can also additionally be substituted by sulfo, nitro, halogen and the radical X, K, in the event that Y is a nitrogen atom, is a benzene radical which is bonded via $-O-$ or $-N(R)-$ to the position adjacent to the azo bridge and which can be substituted by $C_{1-5}$-alkyl, hydroxyl, diethylamino, sulfo and the radical X, a naphthalene radical which can be substituted by chlorine, acetylamino, sulfamoyl, sulfo and the radical X, X being bonded to the naphthalene nucleus either directly or via the phenylamino radical, a 1-phenyl-3-methylpyrazol-5-one radical which can be substituted in the phenyl ring by sulfo, halogen and the radical X, a 1-(2′,2″-disulfostilbene)-3-methylpyrazol-5-one radical which contains the radical X in the 4″-position, an acetoacetanilide radical which can be substituted in the phenyl ring by chlorine, or a 1-methyl-4-hydroxyquinol-2-one radical, or, in the event that Y is a CH group, is the radical of 2-hydroxybenzaldehyde, X is an α,β-dibromopropionyl, α-bromoacryloyl, β-chloroacryloyl, 2,6-difluoro-5-chloropyrimidyl, 2,4-dichlorotriazinyl, 2-chloro-4-isopropoxytriazinyl, 2-chloro-4-(3′-sulfophenylamino)-triazinyl, 2-chloro-4-ethoxytriazinyl, 2-chloro-4-phenoxytriazinyl, 2-fluoro-4-(3′-sulfophenylamino)-triazinyl, 2-fluoro-4-(2′-methylphenylamino)-triazinyl, 2-fluoro-4-isopropylaminotriazinyl, 2-fluoro-5-chloro-6-methylpyrimidinyl, 2-fluoro-5-chloro-6-methylpyrimidinyl, 2-chloro-4-(2′-sulfophenylamino)-triazinyl, 2-chloro-4-aminotriazinyl, 2-chloro-4-phenylaminotriazinyl or β-chloroethylsulfonylbutyryl radical which is bonded via $-NH-$, and Ka is an alkali metal cation.

Other very particularly preferred chromium complexes have the formulae

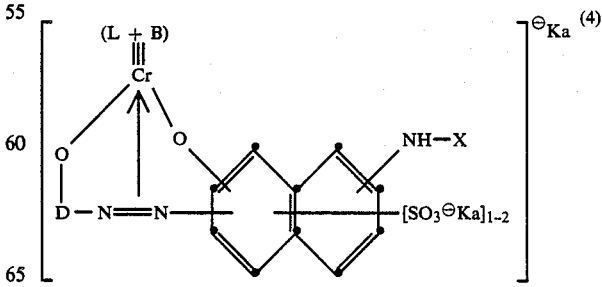

in which B, L, D are as defined above, Ka is an alkali metal cation, the azo bridge is bonded to the naphthalene nucleus in the o-position relative to the oxygen atom bonded to the chromium atom, and X is α,β-dibromopropionyl or α-bromoacryloyl, and

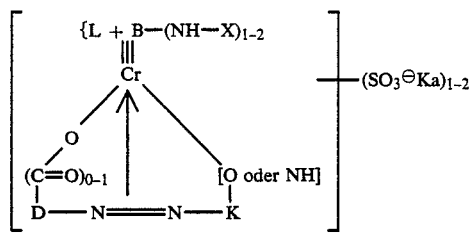

(5)

in which B is the radical of salicylic acid which can be substituted by sulfo, L is water, D is a benzene or naphthalene radical which can be substituted by sulfo, nitro and halogen, K is a 1-phenyl-3-methylpyrazol-5-one radical which can be substituted by sulfo or halogen, or is an acetoacetanilide radical, a naphthalene radical which can be substituted by sulfo or a phenyl radical which is substituted by $C_{1-5}$-alkyl, X is α,β-dibromopropionyl or α-bromoacryloyl, the azo bridge is bonded to D or K in a position adjacent to the $-(C=O)_{0-1}O-$ and [O or NH] radical, and the chromium complex of the formula (5) contains no more than 1 or 2 sulfo groups.

B in the formula (4) is in particular the radical of oxalic acid.

The invention also provides a process for preparing the chromium complexes of the formula (1), which comprises reacting a potentially at least bidentate complexible organic compound which contains the bianionic radical B with a 1:1 chromium complex of the formula

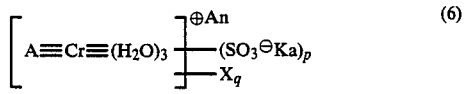

(6)

in which A, X and Ka are as defined under the formula (1), p is 0, 1, 2 or 3, q is 0, 1, or 2 and An is an anion, in an aqueous medium in the absence or presence of a colourless monofunctional ligand L other than water, and if desired subsequently reacting the resulting chromium complex with a compound, or compounds, which introduce(s) the fibre-reactive radical(s) X, the radical B containing at least one sulfo group if p is 0 and at least one fibre-reactive radical if q is 0.

The at least bidentate complexible organic compound is preferably reacted with the 1:1 chromium complex of the formula (6) at a temperature of 60° to 100° C. and at pH 5-11.

The reaction with a compound which introduces the reactive group(s) takes place in particular at a temperature of 15° to 30° C. and at pH 5-8.

The literature contains descriptions of many metallisable azo and azomethine dyes which can supply the radical A, for example of o,o'-dihydroxy-, o-carboyx-o'-hydroxy-, o-hydroxy-o'-aminoazo or azomethine compounds which are in particular of the formula

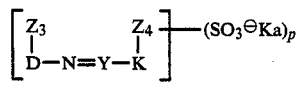

(7)

in which $Z_3$ is a hydroxyl, carboxyl or methoxy group, $Z_4$ is a hydroxyl or HN(R) group, D, K, Y, Ka, R and p are as defined under the formula (2), and D and/or K can contain the functional groups which are suitable for introducing the fibre-reactive group(s) X, for example amino groups or groups which can be converted into amino groups, such as acetylamino and nitro groups. The compounds of the formula (7) in which Y is a nitrogen atom are prepared in a manner known per se, namely by diazotising an amine of the formula

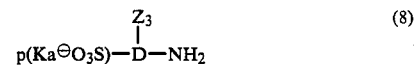

(8)

and coupling the diazo compound onto a coupling component of the formula

(9)

D, K, $Z_3$, $Z_4$, Ka and p being as defined under the formula (7).

The diazotisation of the diazo component of the formula (8) is generally effected at low temperatures through the action of nitrous acid in an aqueous solution of a mineral acid, and the coupling onto the coupling component of the formula (9) is effected at acid, neutral or alkaline pH.

Examples of suitable amines of the formula (8) are: 2-amino-1-hydroxybenzene, 2-amino-1-methoxybenzene, anthranilic acid, 4- or 5-sulfonamidoanthranilic acid, 3- or 5-chloroanthranilic acid, 4-chloro- or 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxyphen-5-yl methyl or benzyl sulfone, 2-amino-1-hydroxyphen-4-yl methyl, ethyl, chloromethyl or butyl sulfone, 6-chloro-, 5-nitro- or 6-nitro-2-amino-1-hydroxyphen-4-yl methyl sulfone, 2-amino-1-hydroxybenzene-4- or 5-sulfamide, -sulf-N-methylamide or -sulf-N-β-hydroxyethylamide, 2-amino-1-methoxybenzene-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5- or 6-sulfonamide, 4- or 5-chloroanisidine, 4- or 5-nitroanisidine, 2-methoxy-5-methylaniline, 2,5-dimethoxyanilane, 4- or 5-β-hydroxyethylsulfonyl-2-methoxyaniline, 4-methyl-6-sulfo-2-amino-1-hydroxybenzene, 2-amino-4-sulfo-1-hydroxybenzene, 4-chloro-6-sulfo-2-amino-1-hydroxybenzene, 6-chloro-4-sulfo-2-amino-1-hydroxybenzene, 5-nitro-4-sulfo-2-amino-1-hydroxybenzene, 4-nitro-6-sulfo-2-amino-1-hydroxybenzene, 6-nitro-4-sulfo-2-amino-1-hydroxybenzene, 4-nitro-6-acetylamino-2-amino-1-hydroxybenzene, 4-acetylamino-2-amino-1-hydroxybenzene, 4-nitro-6-sulfo-2-amino-1-hydroxybenzene, 4-acetylamino-6-sulfo-2-amino-1-hydroxybenzene, 5-acetylamino-2-amino-1-hydroxybenzene, 6-acetylamino-4-sulfo-2-amino-1-hydroxybenzene, 4- chloro-2-amino-1-hydroxybenzene-5-sulfamide, 2-amino-1-hydroxybenzene-4-(N-2'-carboxyphenyl)-sulfamide, 2-amino-1-hydroxyphen-5-yl methyl sulfone, 1-amino-2-hydroxy-4-sulfonaphthalene, 1-amino-2-hydroxy-4-sulfo-6-nitronaphthalene, 1-amino-2-hydroxy-4-sulfo-6-acetamidonaphthalene, 1-amino-2-hydroxy-4,8-disulfonaphthalene, 1-amino-2-hydroxy-6-sulfonaphthalene, 1-amino-2-hydroxy-7-sulfonaphthalene, 1-amino-2-hydroxy-8-sulfonaphthalene, 2-amino-1-hydroxy-4-sulfonaphthalene, 2-amino-1-hydroxy-6-sulfonaphthalene and 2-amino-1-hydroxy-4,8-disulfonaphthalene.

The coupling components of the formula (9) can be derived, for example, from the following groups of coupling components:

naphthols which couple in the o-position relative to the OH group and can be substituted by halogen, in particular chlorine, amino, acylamino, acyl, $C_{1-4}$-alkyl, $C_{1-4}$-alkoxy, sulfonamido, N-monosubstituted or N,N-disubstituted sulfonamido groups, sulfo and sulfonyl groups.

naphthylamines which couple in the o-position relative to the amino group and which can be substituted by halogen, in particular bromine, $C_{1-4}$-alkyl, $C_{1-4}$-alkoxy, sulfonamido, monosubstituted or disubstituted sulfonamido, sulfo or sulfonyl groups.

such 5-pyrazolones and 5-aminopyrazoles as have in the 1-position a phenyl or naphthyl radical which can be substituted by halogen, for example chlorine, nitro, $C_{1-4}$-alkyl and alkoxy groups, sulfonamido, N-alkylated sulfonamido groups, sulfo or sulfonyl groups and in particular amino groups.

such 2,6-dihydroxy-3-cyano- or -3-carboxamido-4-alkylpyridines and 6-hydroxy-2-pyridones as are substituted in the 1-position by substituted or unsubstituted $C_{1-4}$-alkyl for example, methyl, isopropyl, β-hydroxyethyl, β aminoethyl of γ-isopropoxypropyl, or by —NH$_2$ or a substituted amino group, for example dimethylamino or diethylamino, and carry a cyano or carboxamido group in the 3-position and a $C_{1-4}$-alkyl group, in particular methyl, in the 4-position.

such acetoacetanilides and benzoylacetanilides as can be substituted in the anilide nucleus by $C_{1-4}$-alkyl, alkoxy or alkylsulfonyl groups, $C_{1-4}$-hydroxyalkyl, alkoxyalkyl or cyanoalkylsulfonyl groups, sulfonamido or N-alkylated sulfonamido groups, sulfo, acetylamino and halogen.

phenols which are substituted by low molecular weight acylamino groups and/or alkyl groups containing 1 to 5 carbon atoms and couple in the o-position and hydroxyphenols, such as resorcinol.

quinolones, for example quinol-2-ones, in particular 1-$C_{1-4}$-alkyl-4-hydroxyquinol-2-one Examples of such coupling components are: 2-naphthol, 1-naphthol, 1-hydroxynaphthalene-4-, -5- or -8-sulfonic acid or -3,6- or -4,8-disulfonic acid, 1,3- or 1,5-dihydroxynaphthalene, 1-hydroxy-7-aminonaphthalene-3-sulfonic acid, 2-naphthol-6-sulfonamide, 1-hydroxy-7-aminonaphthalene- or -7-N-methylaminonaphthalene- or -7-N-acetylaminonaphthalene-3-sulfonic acid, 2-hydroxynaphth-6-yl-β-hydroxyethyl sulfone, 1-hydroxy-6-aminonaphthalene- or -6-N-methylaminonaphthalene- or -6-acetylaminonaphthalene-3-sulfonic acid, 1-hydroxy-7-aminonaphthalene-3,6-disulfonic acid, 1-hydroxy-6-aminonaphthalene-3,5-disulfonic acid, 1-acetylamino-7-naphthol, 1-hydroxy-6-N-(4'-aminophenyl)-aminonaphthalene-3-sulfonic acid, 1-hydroxy-5-aminonaphthalene-3-sulfonic acid, 1-propionylamino-7-naphthol, 2-hydroxy-6-aminonaphthalene-4-sulfonic acid, 1-carbomethoxyamino-7-naphthol, 1-hydroxy-8-aminonaphthalene-5-sulfonic acid, 1-carboethoxyamino-7-naphthol, 1-hydroxy-8-aminonaphthalene-5,7-disulfonic acid, 1-carbopropoxy-amino-7-naphthol, 1-hydroxy-8-aminonaphthalene-3-sulfonic acid, 1-dimethyl-aminosulfonyl-amino-7-naphthol, 6- or 8-acetylamino-2-naphthol, 1-hydroxy-8-aminonaphthalene-3,5- or -3,6-disulfonic acid, 4-acetylamino-2-naphthol, 2-hydroxy-5-aminonaphthalene-4,7-disulfonic acid, 4-methoxy-1-naphthol, 4-acetylamino-1-naphthol, 1-naphthol-3-, -4-, -5, -8-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1- or -5- or -6-sulfonic acid, 2-aminonaphthalene-5-, -6- or -7-sulfonamide, 2-amino-6-N-(methyl, ethyl, isopropyl, β-oxyethyl or γ-methoxypropyl)naphthalenesulfonamide, 2-aminonaphthalene-6-sulfanilide, 2-amino-6-N-methylnaphthalenesulfanilide, 1-aminonaphthalene-3-, -4- or -5-sulfonamide, 1-aminonaphth-5-yl methyl or ethyl sulfone, 5,8-dichloro-1-aminonaphthalene, 2-phenylaminonaphthalene, 2-N-methylaminonaphthalene, 2-N-ethylaminonaphthalene, 2-phenylaminonaphthalene-5-, -6- or -7-sulfonamide, 2-(3'-chlorophenylamino)-naphthalene-5-, -6- or -7-sulfonamide, 6-methyl-2-aminonaphthalene, 6-bromo-2-aminonaphthalene, 6-methoxy-2-aminonaphthalene, 1,3-dimethylpyrazolone, 3-methyl-5-pyrazolone, 1-phenyl-3-methyl-5-pyrazolone, 1-phenyl-3-carboxamido-5-pyrazolone, 1-(2°-, 3'- or 4'-methylphenyl)-3-methyl-5-pyrazolone, 1-[3'- or 4'-(β-hydroxyethylsulfonyl)phenyl]-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(2'-, 3'- or 4'-nitrophenyl)-3-methyl-5-pyrazolone, 1-(2',5'- or 3',4'-dichlorophenyl)-3-methyl-5-pyrazolone, 1-(2'-, 3'- or 4'-sulfamoylphenyl)-3-methyl-5-pyrazolone, 1-(2'-, 3'- or 4'-methylsulfonylphenyl)-3-methyl-5-pyrazolone, 2,6-dihydroxy-3-cyano-4-methylpyridine, 1-methyl-3-cyano-4-ethyl-6-hydroxypyrid-2-one, 1-amino-3-cyano-4-methyl-6-hydroxyyprid-2-one, 1-phenyl-3-carboxamido-4-methyl-6-hydroxypyrid-2-one, acetoacetanilide, acetoacet-o-, -m- or -p-sulfoanilide, acetoacet-4-(β-hydroxyethylsulfonyl)anilide, acetoacet-o-anisidide, acetoacetonaphthylamide, acetoacet-o-toluidide, acetoacet-o-chloroanilide, acetoacet-m- or -p-chloroanlide, acetoacentanilide-3- or -4-sulfonamide, acetoacet-3- or -4-aminoanilide, acetoacet-m-xylidide, benzoylacetanilide, 4-methylphenol, 3-dialkylaminophenol or, in particular 3-dimethylaminophenol or 3-diethylaminophenol, 4-t-butylphenol, 4-t-amylphenol, 2- or 3-acetylamino-4-methylphenol, 2-methoxycarbonylamino-4-methylphenol, 2-ethoxy-carbonylamino-4-methylphenol, resorcinol, 3,4-dimethylphenol and 2,4-dimethylphenol, 3-amino-4-sulfophenol, 1-(4'-aminophenyl)-3-methyl-5-pyrazolone, 1-(2'-, 3'- or 4'-sulfophenyl)-3-methyl-5-pyrazolone, 1-(2'-chloro-4'- or -5'-sulfophenyl)-3-methyl-5-pyrazolone, 1-(2'-methyl-6'-chlorophenyl)-3-methyl-5-pyrazolone, 1-(2'-methyl-4'-sulfophenyl)-3-methyl-5-pyrazolone, 1-(2'-, 3'- or 4'-chloro- or -methyl- or -sulfophenyl)-3-carboxy-5-pyrazolone, 1-[5'-sulfonaphth-2'-yl]-3-methyl-5-pyrazolone, 1-[4''-amino-2',2''-disulfostilb-4'-ene]-3-methyl-5-pyrazolone, 1-ethyl-3-cyano-4-methyl-6-hydroxy-pyrid-2-one, 1-ethyl-3-sulfomethyl-4-methyl-6-hydroxypyrid-2-one, 2,6-dihydroxy-3-cyano-4-sulfomethylpyridine, 2,4,6-trihydroxypyrimidine and 1-methyl-4-hydroxyquinol-2-one.

To prepare the azomethine dyes of the formula (7), the abovementioned aromatic amines of the formula (8) are condensed in conventional manner with o-hydroxybenzaldehydes or o-hydroxynaphthaldehydes.

Examples of suitable aldehydes are: 2-hydroxybenzaldehyde, 3- or 5-methyl-2-hydroxybenzaldehyde, 3,5- or 3,6-dimethyl-2-hydroxybenzaldehyde, 5-butyl-2-hydroxybenzaldehyde, 5-chloro- or -bromo-2-hydroxybenzaldehyde, 3- or 4-chloro-2-hydroxybenzaldehyde, 3,5-dichloro-2-hydroxybenzaldehyde, 3-chloro-5-methyl-2-hydroxybenzaldehyde, 3-methyl-5-chloro-2-hydroxybenzaldehyde, 3- or 4- or 5-nitro-2-hydroxybenzaldehyde, 3,5-dinitro- or 4-chloro-5-nitro-2-hydroxybenzaldehyde, 4-methoxy-2-hydroxybenzaldehyde, 1-hydroxy-2-naphthaldehyde and its derivative chlorinated in the 4-position, and 2-hydroxy-1-naphthaldehyde.

In preferred chromium complexes according to the invention, Y is a nitrogen atom and K is the radical of a coupling component of the naphthalene series, in particular the radical of an aminonaphtholmonosulfonic or aminonaphtholdisulfonic acid.

If desired, a free amino group in the radical D and/or K can be converted into an acylamino or alkylamino group after the coupling with an acylating or alkylating agent, and similarly a hydroxyl group in the radical D and/or K can be converted by alkylation into an alkoxy group.

In a version of the process for preparing the 1:1 chromium complex azomethine dye of the formula (6), the 1:1 chromium complex of the formula (6) is prepared not with the azomethine of the formula (7) but with a mixture of the amine of the formula (8) and an o-hydroxyaldehyde.

The amines of the formula (8), the coupling components of the formula (9) and the o-hydroxyaldehydes can contain radicals which can be converted into the amino groups, for example acetylamino or nitro groups. For example acetylamino groups and nitro groups can be converted into amino groups by hydrolysis and reduction respectively, advantageously after the preparation of the dyes of the formula (7) or the preparation of the 1:1 chromium complex of the formula (6).

The 1:1 chromium complexes are prepared by methods known per se. For example, the 1:1 chromium complex of the compound of the formula (6) is prepared by reacting the metal-free compound in an acid medium with a salt of trivalent chromium, such as chromium chloride, chromium fluoride or chromium sulfate, in the absence or presence of solubility promoters or chroming accelerants, for example alcohols or hydroxycarboxylic acids. Afterwards, the 1:1 complex is reacted at pH 5-11 with a compound which introduces the radical B.

Examples of compounds which are particularly suitable for introducing the radical B are: salicylic acid, 4- or 5-sulfosalicylic acid, 3-, 4- or 5-amino-2-hydroxybenzoic acid, 5-amino-2-hydroxy-3-sulfobenzoic acid, 1-hydroxynaphthalene-8-carboxylic acid, phthalic acid, 1,2-dihydroxybenzene, 3,4,6-trihydroxybenzoic acid, 2-hydroxyaniline, oxalic acid, malonic acid, lactic acid, 2-hydroxysuccinic acid, tartaric acid, citric acid, 4-amino-6-sulfo-2-hydroxybenzoic acid, 3-amino-5-sulfo-2-hydroxybenzoic acid and 3,5-diaminosalicylic acid, If the reaction of the 1:1 chromium complex of the formula (6) with the organic compound introducing the radical B takes place in the presence or absence of one of the abovementioned colourless monofunctional ligands L other than water, this produces a chromium complex of the formula

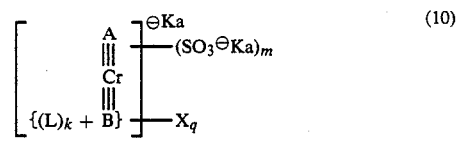
(10)

in which A, B, L, Ka, X, k and m are as defined under the formula (1) and q is 0, 1 or 2.

If the reactive group(s) X in the chromium complex of the formula (1) is or are bonded to the radical A, the reactive group(s) is or are advantageously introduced after the preparation of the 1:1 chromium complex of the formula (6) or preferably after the reaction of the 1:1 chromium complex of the formula (6) with the organic compound introducing the radical B. If the reactive group(s) X in the chromium complex of the formula (1) is or are bonded to the radical B, it is or they are preferably introduced after the reaction with the 1:1 chromium complex of the formula (6).

The fibre-reactive group(s) X is or are introduced into the 1:1 chromium complex of the formula (6) or into the chromium complex of the formula (10) in a manner known per se by reacting these chromium complexes with one or two agents introducing or forming the radical(s) X; the radicals A and/or B in the formulae (6) and (10) have to contain functional groups which are suitable for bonding the fibre-reactive group(s) X. Examples of groups suitable for bonding the radicals X are unsubstituted or monoalkylated amino groups, such as $-NH_2$, $-N(CH_3)H$ or $-N(C_2H_5)H$, and the $\beta$-oxyethylsulfonyl group for example.

The reactive group(s) which is or are bonded via an oxy, thio or preferably amino group is or are introduced by reacting the chromium complexes of the formulae (6) and (10) with one (or two) acylating agents which introduce one or two identical or different radicals X.

The fibre-reactive group(s) which is or are directly bonded to the radicals A and/or B, for example the $\beta$-sulfatoethylsulfonyl group, is or are formed in a manner known per se, for example by sulfating the abovementioned $\beta$-oxyethylsulfonyl group.

The invention also provides a process for dyeing textile materials with chromium complexes, which comprises using an aqueous liquor which contains a compound introducing the radical B, the 1:1 chromium complex of the formula

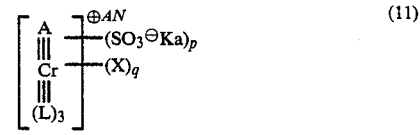
(11)

in which A, L, Ka and X are as defined under the formula (1), p is 0 to 3, q is 0 to 2 and An is anion, and the textile material and can, if desired, also contain further additives, heating the liquor to 100° C. in continuous or stepwise fashion and then bringing it to an alkaline pH, and completing the dyeing. If p is 0 the compound introducing radical B must contain at least one $SO_3^{\ominus}Ka$ group and if q is 0 at least one fibre-reactive radical X.

In particular, the compound introducing the radical B and the 1:1 chromium complex of the formula (11) are deployed in a molar ratio of 2:1 to preferably 1:1.

In a preferred version of the process, the dyeing liquor, which contains the abovementioned components, is raised to 60° to 80° C. in the course of 10 to 45 minutes, is held at said temperature for 10 to 45 minutes, is then raised to 100° C. in the course of 10 to 30 minutes, is maintained at said temperature for 30 to 90 minutes, is cooled down to 85° C., and is brought to pH 8–9 and is used to after-treat the dyeing at 85° C. for a further 10 to 30 minutes.

Examples of the further additives which the liquor may contain are inorganic or organic acids, in particular, acetic acid, alkali metal or ammonium salts, in particular ammonium sulfate, and, if desired, levelling agents.

As described above, the chromium complex of the formula (11) is obtained by reacting an azo or azomethine dye, in particular such a dye of the formula (2), in the presence or absence of a ligand L other than water, with one of the chroming agents mentioned and the fibre-reactive radicals can be introduced at any point of the process, but preferably after the preparation of the 1:1 chromium complex.

In the process according to the invention use is made in particular of 1:1 chromium complexes of the formula

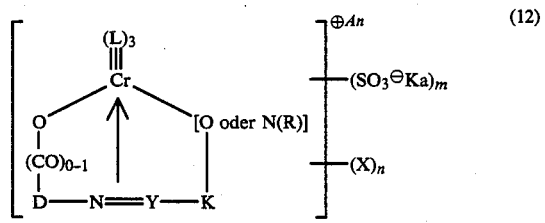
(12)

in which D, K, L, R, Ka, X, Y, m and n are as defined under the formula (3) and An is an anion, and preferably of chromium complexes of the formula

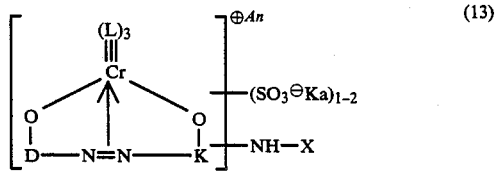
(13)

in which D, K, L, Ka and X are as defined under the formula (4) and An is an anion.

In the process according to the invention, the compound introducing the radical B can be any one of the abovementioned compounds, and acylatable amino groups which are present in the radical B and which are not involved in the formation of the complex can have been previously reacted with an acylating agent introducing the fibre-reactive radical X.

The process according to the invention can be carried out in the absence or presence of a colourless monofunctional compound L other than water, such as one of the abovementioned compounds.

In preferred processes, use is made of (a) an aqueous liquor which contains oxalic acid, malonic acid, citric acid, malic acid, tartaric acid, pyrocatechol, phthalic acid, lactic acid or salicylic acid as the compound introducing the radical B and the 1:1 chromium complex of the formula

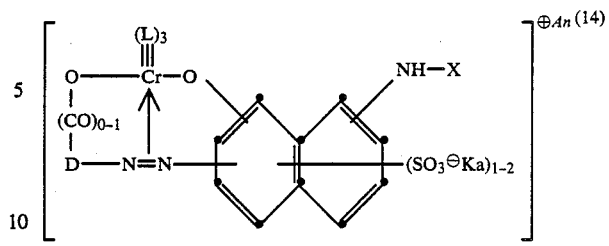
(14)

in which L, Ka and An are as defined under the formula (11), D is a benzene radical which, in addition to being substituted by the $-(CO)_{\overline{0-1}}O-$ group, which is bonded to D in the o-position relative to the azo group, can also be additionally substituted by sulfo, nitro, sulfamoyl and methoxy, or is a naphthalene radical which, in addition to being substituted by the $-(C=O)_{\overline{0-1}}O$ group, which is bonded to D in the o-position relative to the azo group, can also be additionally substituted by sulfo and nitro, the azo bridge is bonded to the naphthalene nucleus in the o-position relative to the —O— radical, and X is $\alpha,\beta$-dibromopropionyl or $\alpha$-bromoacryloyl;

(b) an aqueous liquor which contains oxalic acid and the 1:1 chromium complex of the formula (14);

(c) an aqueous liquor which contains an unsubstituted or sulfo-substituted $\alpha,\beta$-dibromopropionylaminosalicylic acid or $\alpha$-bromoacryloylaminosalicylic acid as the compound introducing the radical B and the 1:1 chromium complex of the formula

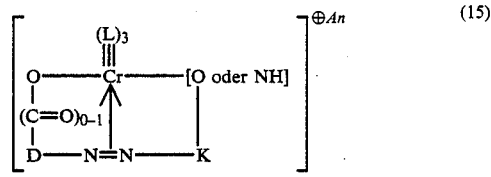
(15)

in which L is water, D is a benzene or naphthalene radical which can be substituted by sulfo, nitro and halogen, K is a 1-phenyl-3-methylpyrazol-5-one radical which can be substituted by sulfo or halogen, an acetoacetanilide radical, a naphthalene radical which can be substituted by sulfo or a phenyl radical which is substituted by $C_{1-5}$-alkyl, the azo bridge is bonded to D and K in positions adjacent to the $-(C=O)_{\overline{0-1}}O-$ and [O or NH] radicals, and An is as defined under the formula (11).

In the process according to the invention, the chromium complex of the formula (1) is thus formed during the dyeing and produces the same dyeing advantages as are obtained with the dyes of the formula (1) which are prepared in substance and isolated.

The novel chromium complexes of the formula (1) and the chromium complexes prepared in the novel dyeing method are suitable for dyeing nitrogen-containing or hydroxyl-containing materials, such as wool, silk, leather, nylon and cotton. They produce level dyeings in yellow, brown, orange, red, blue, grey, green and black shades having good all-round fastness properties, in particular very good rub, wet, wet rub and light fastness. Furthermore, the dyes according to the invention are very compatible with fibre-reactive acid dyes. The abovementioned textile material can have been processed into many different forms, for example, fibre form, yarn form or woven or knitted fabric form.

In the following examples the parts are by weight. The temperatures are given in degrees centigrade. Parts by weight relate to parts by volume as the gram relates to the cubic centimeter.

EXAMPLE 1

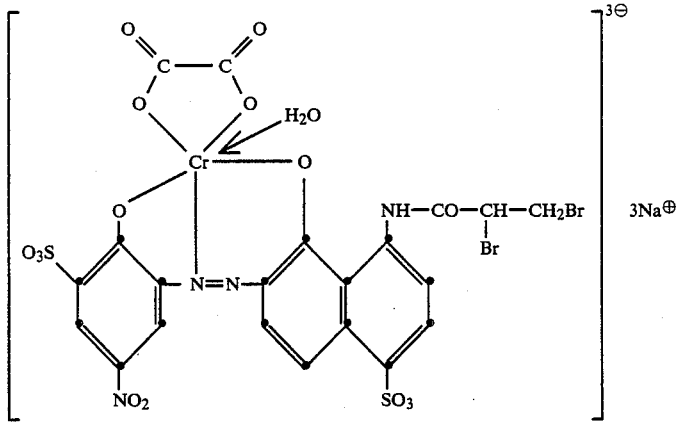

48.44 parts of a monoazo dye which is obtained by diazotising 4-nitro-6-sulfo-2-aminophenol and coupling the diazo compound onto 1-naphthol-8-amino-5-sulfonic acid are converted in conventional manner into the 1:1 chromium complex. The product is suspended in 400 parts of water, and 12.7 parts of oxalic acid×2H₂O are added. The suspension is heated to 75°–80° while a pH of 7–7.3 is maintained with 2N NaOH, and turns into a solution. Said solution is stirred at 75°–80° for 1 hour under constant pH control.

After the adduct formation has ended, the reaction solution is cooled down to 20°–25°. 34 parts of 1,2-dibromopropionyl chloride, diluted with 5 ml of acetone, are added dropwise at 20°–25° in the course of 20–30 minutes, and the pH is maintained at 6.5–7 with 2N NaOH. After 2 hours of stirring under pH control the reactive chromium complex obtained is clarified, and the solution is evaporated to dryness. The dye obtained dyes wool by the method of Dyeing Example 2 in level navy shades having excellent fastness properties.

EXAMPLE 2

53.9 parts of 1:1 chromium complex of a monoazo dye obtained by alkaline coupling of 1-diazo-2-naphthol-4-sulfonic acid onto 2-amino-5-naphthol-7-sulfonic acid are dissolved at pH 7 in 500 parts of water using dilute sodium hydroxide solution. After addition of 11.25 parts of oxalic acid the pH is adjusted to 6.5 with dilute sodium hydroxide solution and the reaction mixture is stirred at 90°–95° C. for 30 minutes. The dye solution is cooled down to 50° C., and 15 parts of sodium bicarbonate are added. After stirring for 10 minutes it is cooled down to 10°–15° C. with 200 parts of ice, 30 parts of 1,2-dibromopropionyl chloride are added dropwise in the course of about 1 hour, and the mixture is stirred at room temperature for a further 2–3 hours. The resulting, dissolved dye of the formula

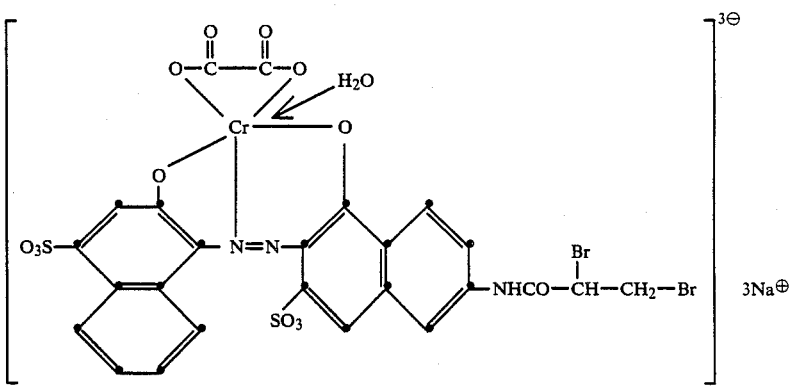

is evaporated to dryness. The dye, obtained in the form of a very readily water-soluble dark powder, dyes wool by the method of Dyeing Example 2 in level dark blue shades having excellent fastness properties.

Further dyes with similar properties are obtained analogously by reacting the 1:1 chromium complexes of the monoazo compounds given in column I of Table I below with the colourless compounds listed in column II and subsequently acylating the resulting 1:2 chromium complex with 1,2-dibromopropionyl chloride. These dyes produce level dyeings on wool even in the weakly acid pH range, in the shades given in column III.

| Example | I | II | III |
|---|---|---|---|
| 3 | 4-nitro-6-sulfo-2-aminophenol → 6-amino-1-hydroxy-3-sulfo-2-naphthyl (structure: HO₃S, NO₂, OH substituted benzene –N=N– hydroxy-sulfo-amino naphthalene) | oxalic acid | grey |
| 4 | 6-nitro-4-sulfo-1-hydroxy-2-aminonaphthalene coupled to 6-amino-1-hydroxy-3-sulfonaphthyl | oxalic acid | grey |
| 5 | 4-nitro-6-sulfo-2-aminophenol → 6-amino-1-hydroxy-3-sulfo-2-naphthyl | malonic acid | grey |
| 6 | 1-hydroxy-4-sulfo-2-naphthyl –N=N– 6-amino-1-hydroxy-3-sulfo-2-naphthyl | malonic acid | blue |
| 7 | 1-hydroxy-4-sulfo-2-naphthyl –N=N– 6-amino-1-hydroxy-3-sulfo-2-naphthyl | citric acid | blue |
| 8 | 1-hydroxy-4-sulfo-2-naphthyl –N=N– 6-amino-1-hydroxy-3-sulfo-2-naphthyl | malic acid | blue |
| 9 | 1-hydroxy-4-sulfo-2-naphthyl –N=N– 6-amino-1-hydroxy-3-sulfo-2-naphthyl | tartaric acid | blue |

-continued

| Example | I | II | III |
|---|---|---|---|
| 10 | (structure: 1-hydroxy-naphthalene-sulfonic acid azo-coupled to 1-hydroxy-6-amino-naphthalene-3-sulfonic acid) | pyrocatechol | blue |
| 11 | (same coupler; diazo component: 2-hydroxy-naphthalene-sulfonic acid) | phthalic acid | blue |
| 12 | (same coupler; diazo: 2-hydroxy-6-nitro-naphthalene-sulfonic acid) | salicylic acid | grey |
| 13 | (same as 12) | malonic acid | grey |
| 14 | (same as 12) | citric acid | grey |
| 15 | (same as 12) | malic acid | grey |

-continued

| Example | I | II | III |
|---|---|---|---|
| 16 | [structure: naphthalene with OH, HO₃S, NO₂, azo-linked to naphthalene with OH, SO₃H, NH₂] | tartaric acid | grey |
| 17 | [structure: naphthalene with OH, HO₃S, NO₂, azo-linked to naphthalene with OH, SO₃H, NH₂] | lactic acid | grey |
| 18 | [structure: benzene with OH, HO₃S, NO₂, azo-linked to naphthalene with OH, SO₃H, NH₂] | salicylic acid | reddish grey |
| 19 | [structure: benzene with OH, HO₃S, NO₂, azo-linked to naphthalene with OH, SO₃H, NH₂] | citric acid | reddish grey |
| 20 | [structure: benzene with OH, HO₃S, NO₂, azo-linked to naphthalene with OH, SO₃H, NH₂] | malic acid | reddish grey |
| 21 | [structure: benzene with OH, HO₃S, NO₂, azo-linked to naphthalene with OH, SO₃H, NH₂] | tartaric acid | reddish grey |
| 22 | [structure: benzene with OH, HO₃S, NO₂, azo-linked to naphthalene with OH, SO₃H, NH₂] | lactic acid | reddish grey |

-continued

| Example | I | II | III |
|---|---|---|---|
| 23 | (structure: 2-hydroxy-5-sulfo-phenyl–N=N–1-hydroxy-3-sulfo-7-amino-naphthalene) | oxalic acid | violet |
| 24 | (structure: 2-hydroxy-5-sulfo-phenyl–N=N–1-hydroxy-3-sulfo-7-amino-naphthalene) | malonic acid | violet |
| 25 | (structure: 2-hydroxy-5-nitro-phenyl–N=N–1-hydroxy-3-sulfo-6-amino-naphthalene) | oxalic acid | blueish grey |
| 26 | (structure: 2-hydroxy-5-nitro-phenyl azo pyrazolone coupled via N–N to sulfo-aminostilbene-disulfonic acid) | oxalic acid | orange |
| 27 | (structure: amino-hydroxy-sulfo-naphthalene azo pyrazolone with p-aminophenyl) | oxalic acid | red |
| 28 | (structure: 2-hydroxy-5-chloro-phenyl–N=N–1-hydroxy-3-sulfo-8-amino-6-sulfo-naphthalene) | oxalic acid | blue |

-continued

| Example | I | II | III |
|---|---|---|---|
| 29 | (structure: 2-hydroxy-4-chloro-phenyl–N=N–6-sulfo-1-hydroxy-2-naphthyl with 8-NH₂ and 5-SO₃H) | malonic acid | blue |
| 29a | (same structure as 29) | tartaric acid | grey |
| 30 | (structure: 3-HO₃S-2-hydroxy-5-chloro-phenyl–N=N–1-hydroxy-2-naphthyl with 8-NH₂ and 5-SO₃H) | oxalic acid | navy |
| 31 | | malonic acid | violet-tinged grey |
| 32 | | tartaric acid | grey |
| 33 | | citric acid | grey |
| 34 | (structure: 3-chloro-2-hydroxy-5-sulfo-phenyl–N=N–1-hydroxy-2-naphthyl with 8-NH₂ and 5-SO₃H) | oxalic acid | grey |
| 35 | | malic acid | grey |
| 36 | | tartaric acid | grey |
| 37 | (structure: 2-hydroxy-4-nitro-5-chloro-phenyl–N=N–6-sulfo-1-hydroxy-2-naphthyl with 8-NH₂ and 5-SO₃H) | oxalic acid | navy |
| 38 | | tartaric acid | grey |
| 39 | (structure: 3-HO₃S-2-hydroxy-5-chloro-phenyl–N=N–3-sulfo-1-hydroxy-2-naphthyl with 8-NH₂) | oxalic acid | navy |

-continued

| Example | I | II | III |
|---|---|---|---|
| 40 | 2-hydroxy-4-nitro-5-chlorophenyl azo → 2-hydroxy-6-amino-naphthalene-4-sulfonic acid | salicylic acid | greenish grey |
| 41 | 2-hydroxy-4-nitrophenyl azo → 2-hydroxy-6-amino-naphthalene-4-sulfonic acid | 3-amino-6-hydroxy-benzoic acid-5-sulfonic acid | greenish grey |
| 42 | 2-hydroxy-4-nitrophenyl azo → 2-hydroxy-6-amino-naphthalene-4-sulfonic acid | oxalic acid | grey |
| 43 | 2-hydroxy-3-sulfo-5-nitrophenyl azo → 1-hydroxy-3-sulfo-6-(4-aminophenylamino)-naphthalene | oxalic acid | grey |
| 44 | 2-hydroxy-3-sulfo-5-nitrophenyl azo → 1-hydroxy-3-sulfo-6-(4-aminophenylamino)-naphthalene | tartaric acid | grey |

-continued

| Example | I | II | III |
|---|---|---|---|
| 45 | [structure: 2-hydroxy-3-sulfo-5-nitrophenyl-azo-1-hydroxy-2-sulfo-8-amino-naphthalene] | oxalic acid | grey |
| 46 | [structure: 2-hydroxy-3-sulfo-5-nitrophenyl-azo-1-hydroxy-2-sulfo-8-amino-naphthalene] | malonic acid | greyish blue |
| 47 | [structure: hydroxy-sulfo-amino-naphthyl-azo-hydroxy-sulfo-naphthalene] | oxalic acid | grey |
| 48 | [structure: 2-hydroxy-4-nitrophenyl-azo-1-hydroxy-3-sulfo-6-amino-7-sulfo-naphthalene] | oxalic acid | grey |
| 49 | [structure: 2-hydroxy-4-sulfamoylphenyl-azo-1-hydroxy-3-sulfo-6-amino-naphthalene] | oxalic acid | grey |
| 50 | [structure: 2-hydroxy-3,5-dichlorophenyl-azo-1-hydroxy-8-amino-3,6-disulfo-naphthalene] | oxalic acid | navy |
| 51 | [structure: 2-hydroxy-3,5-dichlorophenyl-azo-1-hydroxy-8-amino-3,6-disulfo-naphthalene] | oxalic acid | navy |

-continued

| Example | I | II | III |
|---|---|---|---|
| 52 | 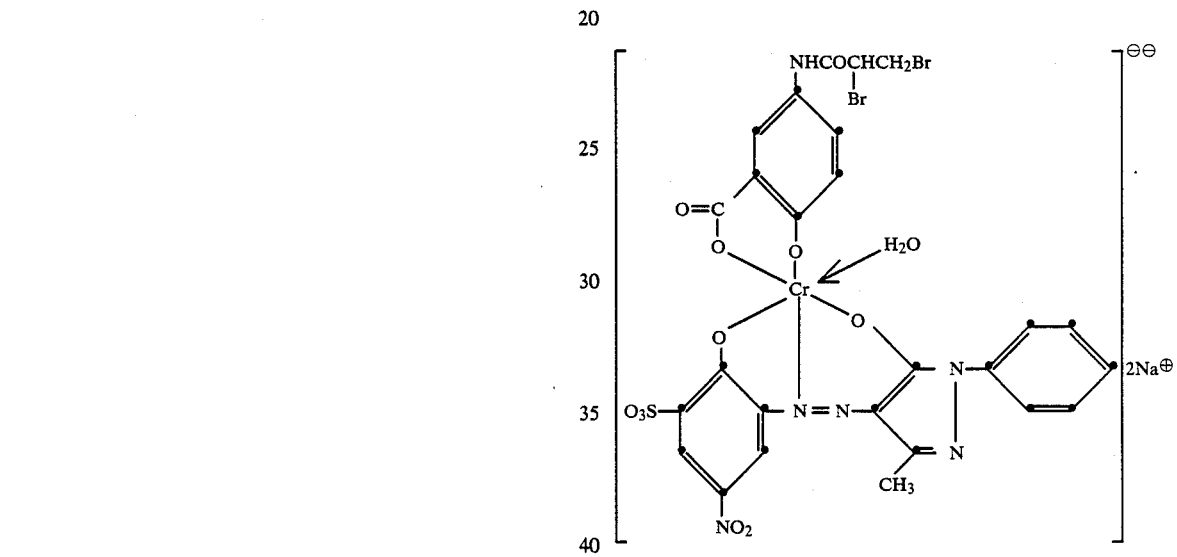 | oxalic acid | orange |

EXAMPLE 53

41.9 parts of the monoazo dye obtained from diazotised 1-hydroxy-2-amino-4-nitrobenzene-6-sulfonic acid and 1-phenyl-3-methyl-5-pyrazolone, in the form of the 1:1 chromium complex which contains 1 atom of chromium per molecule of azo dye, are dissolved with stirring at pH 7 in 500 parts of water.

After addition of 15.5 parts of 2-hydroxy-5-aminobenzoic acid the reaction mixture is heated to 90° C. and is at the same time held at pH 6.5–7.5 by the dropwise addition of dilute sodium hydroxide solution, this producing a clear solution of the only addition product.

After the solution has cooled down to 10°–15° C. and 15 parts of sodium bicarbonate have been added, a solution of 30 parts of 1,2-dibromopropionyl chloride in 30 parts of acetone is added dropwise with thorough stirring in the course of 1 hour, and the reaction mixture is stirred at room temperature for a further 3 hours.

The resulting dye of the following structure is precipitated from the clear reaction solution by adding sodium chloride, is isolated by filtration, is washed with dilute sodium chloride solution, and is dried at 60° C. in vacuo. The novel dye is readily water-soluble and produces on wool by the indicated dyeing methods full, wet- and light-fast orange shades.

A dye of the same structure is obtained when the abovementioned 1:1 chromium complex is reacted in aqueous solution at pH 6–6.5 and 50°–60° C. with 37 parts of conventionally prepared 2-hydroxy-5-(N-dibromopropionyl)aminobenzoic acid to give the uniform mixed complex.

Further dyes with similar properties are obtained analogously by reacting the 1:1 chromium complexes of the monoazo compounds given in column I of Table II below with the colourless compounds listed in column II and subsequently acylating the resulting chromium complexes with 1,2-dibromopropionyl chloride. Column III gives the shades of the dyes on wool.

TABLE II

| Example | I | II | III |
|---|---|---|---|
| 54 | 2-(COOH)-C6H4-N=N-C(=C(OH)-NH-C6H4-SO3H)-C(CH3)=N (pyrazolone-type) | 5-amino-2-hydroxybenzoic acid (H2N, COOH, OH) | olive-tinged yellow |
| 55 | same as 54 | 4-amino-2-hydroxybenzoic acid | yellow |
| 56 | same as 54 | 3-amino-4-hydroxy-5-sulfobenzoic acid | yellow |
| 57 | same as 54 | 5-amino-4-hydroxy-3-sulfobenzoic acid (HO3S, COOH, OH, NH2) | yellow |
| 58 | 2-hydroxy-3-[(1-hydroxy-1-methyl... -2-(phenylcarbamoyl))azo]-5-nitro-benzenesulfonic acid derivative | 5-amino-2-hydroxybenzoic acid | brownish yellow |
| 59 | same as 58 | 4-amino-2-hydroxybenzoic acid | yellow |
| 60 | 2-hydroxy-5-nitro-3-[(pyrazolone)azo]-benzenesulfonic acid derivative (with phenyl on N) | 5-amino-2-hydroxy-3-sulfobenzoic acid | orange |

TABLE II-continued

| Example | I | II | III |
|---|---|---|---|
| 61 | 2-hydroxy-3-[(2-hydroxy-5-sulfo-3-nitrophenyl)azo]-1-phenyl-pyrazole structure (with OH, HO₃S, NO₂ on one ring; CH₃ on pyrazole; N-phenyl) | 3-amino-4-hydroxy-5-sulfobenzoic acid (COOH, OH, NH₂, HO₃S) | orange |
| 62 | similar hydrazone structure with HO₃S, NO₂ substituents and N-phenyl | 4-amino-2-hydroxybenzoic acid (COOH, OH, NH₂) | orange |
| 63 | similar hydrazone with HO₃S, NO₂ and N-phenyl | 4-amino-3-sulfo-2-hydroxybenzoic acid (COOH, HO₃S, OH, NH₂) | orange |
| 64 | hydrazone with HO₃S and Cl substituents on left ring; N-(4-chlorophenyl) | 5-amino-2-hydroxybenzoic acid (COOH, OH, H₂N) | brownish red |
| 65 | hydrazone with HO₃S, Cl; N-(4-chlorophenyl) | 4-amino-2-hydroxybenzoic acid (COOH, OH, NH₂) | red |
| 66 | hydrazone with HO₃S, Cl; N-(4-chlorophenyl) | 5-amino-2-hydroxy-4-sulfobenzoic acid (COOH, OH, SO₃H, H₂N) | red |
| 67 | hydrazone with COOH on left ring; N-(4-sulfophenyl), CH₃ | 5-amino-2-hydroxy-4-sulfobenzoic acid (COOH, OH, SO₃H, H₂N) | yellow |

TABLE II-continued

| Example | I | II | III |
|---|---|---|---|
| 68 | 2-hydroxy-3-sulfo-5-nitrophenyl azo coupled to CH₃C(OH)=C(CONHPh)– | 5-amino-2-hydroxy-3-sulfobenzoic acid (COOH, OH, SO₃H, NH₂) | yellow |
| 69 | 3-hydroxy-6-sulfo-naphthalen-2-yl azo coupled to pyrazolone (1-phenyl-3-methyl-5-hydroxy-pyrazole) | 5-amino-2-hydroxy-3-sulfobenzoic acid | claret |
| 70 | 2-hydroxy-6-nitro-8-sulfo-naphthalen-1-yl azo 2-hydroxy-naphthalen-1-yl | 5-amino-2-hydroxy-3-sulfobenzoic acid | black |
| 71 | 2-hydroxy-4-nitrophenyl azo 2-amino-6-sulfo-naphthalen-1-yl | 5-amino-2-hydroxy-3-sulfobenzoic acid | dark green |
| 72 | 2-hydroxy-3-sulfo-5-nitrophenyl azo 2-hydroxy-5-tert-butylphenyl | 5-amino-2-hydroxy-3-sulfobenzoic acid | brown |
| 73 | 3-hydroxy-6-sulfo-naphthalen-2-yl azo coupled to 1-phenyl-3-methyl-5-hydroxy-pyrazole | 5-amino-2-hydroxy-3-sulfobenzoic acid | claret |

TABLE II-continued

| Example | I | II | III |
|---|---|---|---|
| 74 | 1-hydroxy-4-sulfo-naphthalene azo to 3-methyl-1-phenyl-5-hydroxypyrazole (enol-hydrazone form) | 4-amino-2-hydroxybenzoic acid | claret |
| 75 | 1-hydroxy-5-sulfo-naphthalene azo to 3-methyl-1-phenyl-5-hydroxypyrazole | 3-amino-2-hydroxy-5-sulfobenzoic acid | claret |
| 76 | 1-hydroxy-6-sulfo-naphthalene azo to 3-methyl-1-phenyl-5-hydroxypyrazole | 4-amino-2-hydroxy-3-sulfobenzoic acid | claret |
| 77 | 2-hydroxy-4-sulfo-5-nitrobenzene azo to 2-hydroxynaphthalene | 5-amino-2-hydroxy-3-sulfobenzoic acid | violet-tinged brown |
| 78 | 2-hydroxy-4-sulfo-5-nitrobenzene azo to 2-hydroxynaphthalene | 5-amino-2-hydroxybenzoic acid | brownish violet |
| 79 | 2-hydroxy-4-nitrobenzene azo to 1-hydroxy-4-sulfonaphthalene | 4-amino-2-hydroxy-5-sulfobenzoic acid | reddish blue |
| 80 | 1-hydroxy-4-sulfonaphthalene azo to 1-hydroxy-6-sulfonaphthalene | 4-amino-2-hydroxybenzoic acid | blue |

TABLE II-continued

| Example | I | II | III |
|---|---|---|---|
| 81 | (naphthyl-azo-naphthyl with OH, HO, SO₃H, HO₃S substituents) | 5-amino-2-hydroxybenzoic acid (COOH, OH, NH₂) | greenish blue |
| 82 | (2-hydroxy-4-nitrophenyl-azo-aminonaphthyl-sulfonic acid) | 5-amino-2-hydroxybenzoic acid (COOH, OH, H₂N) | dark green |
| 83 | (2-hydroxy-4-nitrophenyl-azo-aminonaphthyl-sulfonic acid) | 5-amino-2-hydroxybenzoic acid (COOH, OH, NH₂) | green |
| 84 | (2-hydroxy-4-nitrophenyl-azo-aminonaphthyl-sulfonic acid) | 3-amino-4-hydroxy-5-sulfobenzoic acid (COOH, OH, NH₂, HO₃S) | olive-tinged green |
| 85 | (2-hydroxy-4-nitrophenyl-azo-aminonaphthyl-sulfonic acid) | 5-amino-2-hydroxy-3-sulfobenzoic acid (COOH, HO₃S, OH, NH₂) | green |
| 86 | (nitronaphthyl-sulfonic acid-azo-hydroxynaphthyl with OH, HO, HO₃S, O₂N) | 5-amino-2-hydroxybenzoic acid (COOH, OH, H₂N) | reddish black |

TABLE II-continued

| Example | I | II | III |
|---|---|---|---|
| 87 | HO₃S—[naphthol-OH]—N=N—[naphthol-HO]—, O₂N substituent | 2-amino-4-hydroxybenzoic acid (COOH, OH, NH₂) | black |
| 88 | HO₃S—[naphthol-OH]—N=N—[naphthol-HO]—, O₂N substituent | HO₃S-substituted 2-amino-4-hydroxybenzoic acid (COOH, OH, NH₂) | black |
| 89 | HO₃S—[naphthol-OH]—N=N—[naphthol-HO]— | HO₃S-substituted 4-amino-2-hydroxybenzoic acid (COOH, OH, NH₂) | blue |

EXAMPLE 90

38.9 parts of the monoazo dye obtained from diazotised 1-hydroxy-2-amino-4-nitrobenzene-6-sulfonic acid and 2-hydroxynaphthalene, in the form of the 1:1 chromium complex containing 1 atom of chromium per molecule of azo compound, are suspended with stirring in 600 parts of water at 65° C., and are brought into solution by adding 5N sodium hydroxide solution up to pH 9.0-9.5. A temperature of 65°-70° C. being maintained, a solution of 36.0 parts of crystalline sodium sulfide (Na₂S×9H₂O) in 100 parts of water is then added dropwise in the course of 1 hour. The reaction of the nitro group, which is accompanied by a change in colour from reddish violet to dark blue, is complete after 2 hours of stirring. The resulting, amino-carrying 1:1 chromium complex is precipitated by neutralising the reaction solution and adding sodium chloride, is isolated by filtration and is washed with dilute sodium chloride solution. The filter cake obtained is dissolved with stirring and addition of dilute sodium hydroxide solution at pH 7-7.5 in 600 parts of water at 70° C. After addition of a neutral solution of 14 parts of salicylic acid in 100 parts of water the reaction mixture is heated to 90°-95° C. and is stirred at pH 7.0-7.5 until the adduct formation to form the uniform blue mixed complex is complete. The reaction solution is then cooled down to 10°-15°, and a solution of 30 parts of 1,2-dibromopropionyl chloride in 30 parts of acetone is added in the course of 1 hour during which pH 6.0-6.5 is maintained by the dropwise addition of 2N sodium hydroxide solution. After a further 2 hours of stirring at room temperature the dye of the following structure

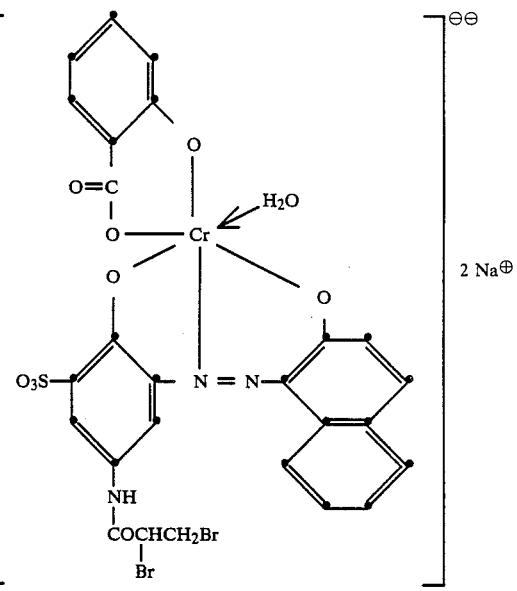

is precipitated from the reaction solution by adding sodium chloride, is isolated by filtration and is dried at 60°-70° C. in vacuo.

The novel, readily water-soluble dye produces on wool by the indicated methods full reddish dark violet shades having very good fastness properties.

Further dyes with similar properties can be obtained analogously by reacting, in the form of 1:1 chromium complexes, the amino-containing monoazo compounds given in column I in Table III below with the colourless compounds listed in column II and subsequently acylating the resulting chromium complex with 1,2-dibromopropionyl chloride. Column III gives the shades of the novel dyes on wool.

TABLE III

| Example | I | II | III |
|---|---|---|---|
| 91 | (structure: 2-hydroxy-5-sulfo-3-amino-phenyl azo pyrazolone with phenyl and CH3, NH2) | COOH–COOH | |
| 92 | (same aryl-azo-pyrazolone as 91) | COOH–CH2–COOH | orange |
| 93 | (same aryl-azo-pyrazolone as 91) | 5-sulfo-2-hydroxy benzoic acid (COOH, OH, HO3S) | orange |
| 94 | (3-amino-2-hydroxy-5-sulfo-phenyl azo pyrazolone variant) | 2-hydroxy benzoic acid (COOH, OH) | reddish orange |
| 95 | (naphthyl azo pyrazolone: OH, HO3S, H2N on naphthalene) | COOH–CH2–COOH | claret |
| 96 | (naphthyl azo pyrazolone as 95) | 2-hydroxy-5-sulfo benzoic acid (COOH, OH, SO3H) | claret |

TABLE III-continued

| Example | I | II | III |
|---|---|---|---|
| 97 | 4-amino-2-hydroxy-5-sulfo-phenyl azo coupled to 2-hydroxy-5-(1,1-dimethylethyl)phenyl | COOH–COOH | brown |
| 98 | 4-amino-2-hydroxy-5-sulfo-phenyl azo coupled to 2-hydroxy-5-(1,1-dimethylethyl)phenyl | 2-hydroxybenzoic acid (salicylic acid) | brown |
| 99 | 6-amino-1-hydroxy-3-sulfo-naphthalen-2-yl azo coupled to 2-hydroxynaphthalen-1-yl | COOH–COOH | greyish blue |
| 100 | 6-amino-1-hydroxy-3-sulfo-naphthalen-2-yl azo coupled to 2-hydroxynaphthalen-1-yl | COOH–CH$_2$–COOH | greyish blue |
| 101 | 6-amino-1-hydroxy-3-sulfo-naphthalen-2-yl azo coupled to 2-hydroxynaphthalen-1-yl | 5-sulfo-2-hydroxybenzoic acid | greenish-tinged blueish grey |
| 102 | 6-amino-1-hydroxy-3-sulfo-naphthalen-2-yl azo coupled to 2-hydroxynaphthalen-1-yl | 2-hydroxybenzoic acid | greenish-tinged blueish grey |

Further dyes with similar properties are obtained analogously by reacting the 1:1 chromium complexes of the amino monoazo compounds which are given in column I of Table IV below and which have been reacted with the reactive groups given in column II with the colourless compounds listed in column III. The novel dyes produce level dyeings on wool in the shades given in column IV.

TABLE IV

| Example | I | II | III | IV |
|---|---|---|---|---|
| 103 | [naphthol azo compound with OH, Cl, N=N, OH, NH₂, SO₃H, SO₃H substituents] | Cl—C(=O)—CH(Br)—CH₂Br | oxalic acid | navy |
| 104 | " | " | malonic acid | greenish grey |
| 105 | " | " | salicylic acid | violet-tinged blue |
| 106 | " | " | malic acid | grey |
| 107 | " | " | tartaric acid | grey |
| 108 | " | " | citric acid | grey |
| 109 | [naphthol azo compound with OH, HO₃S, NO₂, OH, NH₂, SO₃H substituents] | cyanuric chloride (2,4,6-trichloro-1,3,5-triazine) | oxalic acid | greenish grey |
| 110 | " | " | malonic acid | violet-tinged grey |
| 111 | [naphthol azo compound with OH, Cl, N=N, HO₃S, NH₂, SO₃H substituents] | cyanuric chloride (2,4,6-trichloro-1,3,5-triazine) | oxalic acid | grey |
| 112 | " | 2,4,6-trifluoro-5-chloropyrimidine | oxalic acid | greenish black |

TABLE IV-continued

| Example | I | II | III | IV |
|---|---|---|---|---|
| 113 | OH, SO₃H, OH, NO₂ phenyl-N=N-naphthalene with NH₂, SO₃H | Cl—C(=O)—CH=CH—CH=CH—Cl | oxalic acid | greenish blue |
| 114 | " | triazine with OCH(CH₃)₂ and two Cl | oxalic acid | grey |
| 115 | OH, naphthalene-N=N-naphthalene with SO₃H, HO₃S, OH, NH₂ | triazine with Cl, Cl, and O-phenyl | oxalic acid | blue |
| 116 | " | triazine with F, F, and NH—CH(CH₃)(CH₃) | " | blue |

TABLE IV-continued

| Example | I | II | III | IV |
|---|---|---|---|---|
| 117 | " | pyrimidine with F, F, CH₂Cl, Cl substituents | " | blue |
| 118 | " | pyrimidine with F, F, CH₃, Cl substituents | " | blue |
| 119 | " | pyrimidine with F, Cl, Cl, Cl substituents | " | blue |
| 120 | naphthalene-azo-phenyl chromophore with NH₂, OH, SO₃H, OH, Cl, SO₃H substituents | ClCO—CHBrCH₂Br | oxalic acid | violet |

TABLE IV-continued

| Example | I | II | III | IV |
|---|---|---|---|---|
| 121 | [structure: azo dye with OH, SO₃H, Cl on left ring; OH, N=N, SO₃H on middle naphthalene; NH₂ on right ring] | " | " | navy |
| 122 | [structure: azo dye with OH, O₂N on left ring; OH, N=N, SO₃H on middle naphthalene; NH₂, SO₃H on right ring] | " | " | blue |
| 123 | [structure: azo dye with OH, Cl on left ring; OH, N=N, SO₃H on middle naphthalene; NH₂, SO₃H on right ring] | " | " | blueish violet |
| 124 | [structure: azo dye with SO₃H, OH, NH₂ on left ring; OH, N=N, SO₃H on middle naphthalene; NH₂, SO₃H on right ring] | ClCO—CHBrCH₂Br | oxalic acid | grey |

TABLE IV-continued

| Example | I | II | III | IV |
|---|---|---|---|---|
| 125 | (structure) | " | " | violet |
| 126 | (structure) | " | " | violet-tinged blue |
| 127 | (structure) | " | " | grey |
| 128 | (structure) | ClCOCHBrCH₂Br | oxalic acid | greyish blue |

TABLE IV-continued

| Example | I | II | III | IV |
|---|---|---|---|---|
| 129 | [structure: naphthalene with SO₃H, OH, SO₃H, NH₂ groups, azo-linked to phenyl with OH, Cl] | " | " | reddish grey |
| 130 | [structure: naphthalene with SO₃H, OH, SO₃H, NH₂ groups, azo-linked to phenyl with OH, Cl, Cl] | " | " | " |
| 131 | [structure: naphthalene with SO₃H, OH, SO₃H, NH₂ groups, azo-linked to phenyl with OH, NO₂] | " | " | greyish violet |
| 132 | [structure: naphthalene with SO₃H, OH, SO₃H, NH₂ groups, azo-linked to phenyl with OH, O₂N, Cl] | ClCOCHBrCH₂Br | oxalic acid | grey |

TABLE IV-continued

| Example | I | II | III | IV |
|---|---|---|---|---|
| 133 | (OH, NO2-phenyl)–N=N–(OH, SO3H, SO3H-naphthyl)–NH2 | " | " | greenish grey |
| 134 | (OH, HO3S, NO2-phenyl)–N=N–(OH, SO3H-naphthyl)–NH2 | " | " | grey |
| 135 | (OH, HO3S, Cl-phenyl)–N=N–(OH, SO3H-naphthyl)–NH2 | " | " | navy |
| 136 | (OH, HO3S-naphthyl)–N=N–(OH, SO3H, NH2-naphthyl) | difluorochloropyrimidine | oxalic acid | navy |
| 137 | " | ClCOCH2Cl | " | " |
| 138 | " | ClCOCH2CH2Cl | " | " |
| 139 | " | ClCOCH=CH2 | " | " |

TABLE IV-continued

| Example | I | II | III | IV |
|---|---|---|---|---|
| 140 | | ClCOCBr=CH$_2$ | " | " |
| 141 | [structure: naphthalene-azo-naphthalene with OH, NH$_2$, SO$_3$H, HO$_3$S groups] | ClCOCHBrCH$_2$Br | " | blue |
| 142 | [structure: phenol-N=CH-phenol with OH, NO$_2$, HO$_3$S groups] | ClCO—CH—CH$_2$Br with Br | [structure: benzene with COOH, OH, SO$_3$H, NH$_2$] | yellow |
| 143 | [structure: naphthalene with N=C(OH)—C(CH$_3$)=N—CO-chlorophenyl, OH, HO$_3$S, NO$_2$] | " | " | brownish orange |
| 144 | [structure: naphthalene-azo-phenol with N-CH$_3$, OH, HO$_3$S, Cl] | " | " | blueish red |

TABLE IV-continued

| Example | I | II | III | IV |
|---|---|---|---|---|
| 145 | naphthalene with HO₃S, OH, N=N linked to phenyl with OH and N(C₂H₅)₂ | | | blue |
| 146 | phenyl(HO₃S, OH)–N=N–phenyl(OH, NO₂, OH) | " | " | red |
| 147 | phenyl(SO₂NH₂, OH)–N=N–naphthalene(OH, Cl, Cl) | " | " | reddish blue |
| 148 | phenyl(HO₃S, OH, Cl)–N=N–naphthalene(OH, HN–CO–CH₃) | ClCO–CH(Br)–CH₂Br | benzene with COOH, OH, SO₃H, NH₂ | greyish blue |

TABLE IV-continued

| Example | I | II | III | IV |
|---|---|---|---|---|
| 149 | [2-hydroxy-4-nitro-5-chlorophenyl azo coupled to 2-hydroxy-naphthalene-sulfonic acid (SO₃H)] | " | " | " |
| 150 | [2-hydroxy-6-sulfo-naphthyl azo coupled to 2-hydroxy-4-sulfo-naphthalene] | " | " | " |
| 151 | [2-hydroxy-6-sulfo-naphthyl azo coupled to 2-hydroxy-6-nitro-naphthalene] | " | " | black |
| 152 | [2-hydroxy-6-sulfo-naphthyl azo coupled to 2-hydroxy-5-sulfo-naphthalene] | ClCO—CH(Br)—CH₂—Br | 3-carboxy-4-hydroxy-5-amino-benzenesulfonic acid isomer | navy |

Structures for column III:
- Example 151: benzene with COOH, OH, NH₂, SO₃H substituents (3-carboxy-4-hydroxy-5-amino benzene sulfonic acid)
- Example 152: benzene with COOH, OH, SO₃H, NH₂ substituents

TABLE IV-continued

| Example | I | II | III | IV |
|---|---|---|---|---|
| 153 | (OH, NHCOCH₃, SO₃H, OH, SO₃H, Cl substituted azo compound) | ClCO—CH—CH₂—Br, with Br on CH | (benzene with COOH, OH, SO₃H, NH₂) | navy |
| 154 | (OH, Cl, Cl, OH, Cl, SO₃H substituted azo naphthalene) | " | " | " |
| 155 | (NH₂, OH, SO₃H, OH, SO₃H substituted dinaphthyl azo) | " | " | " |
| 156 | (OH, SO₃H, OH, SO₃H substituted dinaphthyl azo) | " | " | " |

TABLE IV-continued

| Example | I | II | III | IV |
|---|---|---|---|---|
| 157 | (naphthalene-SO₃H with OH, SO₃H, N=N to phenyl with OH, Cl, OCH₃) | " | " | " |
| 158 | (naphthol azo naphthalene disulfonic acid structure) | " | " | " |
| 159 | (naphthalene-SO₃H with OH, N=N to naphthalene with OH, SO₃H) | ClCO—CH(Br)—CH₂—Br | (benzene with COOH, OH, NH₂) | navy |
| 160 | (naphthalene-SO₃H with OH, SO₃H, N=N to phenyl with OH, Cl, OCH₃) | " | " | " |

TABLE IV-continued

| Example | I | II | III | IV |
|---|---|---|---|---|
| 161 | [naphthalene-azo structure with OH, OH, SO₃H, NO₂] | " | " | black |
| 162 | [phenyl-azo-phenyl structure with OH, OH, NH₂, SO₃H, NO₂] | " | [benzene with COOH, OH, SO₃H, NH₂] | violet |
| 163 | [naphthalene-azo-phenyl structure with OH, NH₂, OH, SO₃H, SO₂NH₂] | " | oxalic acid | grey |
| 164 | [naphthalene-azo-naphthalene structure with OH, NH₂, OH, SO₃H, SO₃H] | [triazine ring with F, F, F, Cl] | oxalic acid | blue |

TABLE IV-continued

| Example | I | II | III | IV |
|---|---|---|---|---|
| 165 | " | cyanuric chloride with one Cl replaced by phenoxy | " | blue |
| 166 | OH, CH₃, CH₃, OH, NO₂, HO₃S substituted phenyl-N=N-phenyl | Br-CH₂-CH(Br)-CO-Cl | COOH, OH, SO₃H, NH₂ substituted benzene | reddish brown |
| 167 | OH, OH, Cl, HO₃S substituted phenyl-N=N-phenyl | " | " | red |
| 168 | SO₂NH₂, OH, OH, HO₃S substituted naphthyl-N=N-naphthyl | " | " | blue |

TABLE IV-continued

| Example | I | II | III | IV |
|---|---|---|---|---|
| 169 | [naphthalene with SO₃H, NH₂, OH, N=N to phenyl with OH, HO₃S, Cl] | Cl—CO—CH(Br)—CH₂—Br | [benzene with COOH, OH, NHCO—CH₃] | navy |
| 170 | [naphthalene with NH₂, OH, N=N, SO₃H, HO₃S, NO₂] | [hydroxytriazine with NH-phenyl-SO₃H, Cl] | oxalic acid | grey |
| 171 | " | [triazine with NH₂, Cl, Cl] | oxalic acid | grey |
| 172 | " | [triazine with NH-phenyl, Cl, Cl] | " | grey |

TABLE IV-continued

| Example | I | II | III | IV |
|---|---|---|---|---|
| 173 | [naphthalene-azo-phenol with OH, SO₃H, OH, O₂N substituents] | Br—CH₂—CH(Br)—C(=O)—Cl | aminohydroxybenzoic acid with SO₃H | navy |
| 174 | " | " | aminohydroxybenzoic acid | navy |
| 175 | [same as 173] | Br—CH₂—CH(Br)—C(=O)—Cl | aminohydroxybenzoic acid (isomer) | navy |
| 176 | " | " | diaminohydroxybenzoic acid | reddish grey |
| 177 | [naphthalene-azo-naphthalene with SO₃H, OH, OH, HO₃S] | " | diaminohydroxybenzoic acid | grey |

TABLE IV-continued

| Example | I | II | III | IV |
|---|---|---|---|---|
| 178 | " | ClCH₂CH₂—SO₂(CH₂)₃—C(=O)—Cl | (H₂N, SO₃H, OH, COOH-substituted benzene) | violet-tinged grey |
| 179 | (naphthalene with OH, SO₃H, N=N, NO₂, HO₃S substituents) | Br—CH₂—CH(Br)—C(=O)—Cl | (H₂N, SO₃H, OH, COOH-substituted benzene) | blue |
| 180 | (naphthalene with OH, SO₃H, N=N, NO₂, HO₃S substituents) | Br—CH₂—CH(Br)—C(=O)—Cl | (N₂H, OH, COOH-substituted benzene) | blue |
| 181 | " | " | (NH₂, OH, COOH-substituted benzene) | navy |

TABLE IV-continued

| Example | I | II | III | IV |
|---|---|---|---|---|
| 182 | 1-(2-hydroxy-4-sulfonaphthyl)azo-2-hydroxynaphthalene | " | 5-amino-3-sulfo-2-hydroxybenzoic acid | navy |
| 183 | " | " | 5-amino-2-hydroxybenzoic acid | blue |
| 184 | " | " | 4-amino-2-hydroxybenzoic acid | navy |
| 185 | 1-(2-hydroxy-4-sulfo-6-nitronaphthyl)azo-2-hydroxynaphthalene | BrCH₂—CHBr—C(=O)Cl | 4-amino-5-sulfo-2-hydroxybenzoic acid | grey |

TABLE IV-continued

| Example | I | II | III | IV |
|---|---|---|---|---|
| 186 | (naphthalene azo structure with NH₂, OH, SO₃H, HO₃S, and chlorophenol-OH) | ClCH₂CH₂—SO₂(CH₂)₃—C(=O)—Cl | aminohydroxybenzoic acid with SO₃H substituent (H₂N, SO₃H, OH, COOH on benzene) | blue |
| 187 | (naphthalene azo structure with OH, SO₃H, and chloro-nitrophenol-OH) | Br—CH₂—CH(Br)—C(=O)—Cl | 4-amino-2-hydroxybenzoic acid (H₂N, OH, COOH) | greenish navy |
| 188 | " | " | 4-amino-2-hydroxybenzoic acid (H₂N, OH, COOH) | navy |
| 189 | " | " | 4-amino-2-hydroxybenzoic acid (H₂N, OH, COOH) | navy |

TABLE IV-continued

| Example | I | II | III | IV |
|---|---|---|---|---|
| 190 | (naphthalene azo phenol with OH, NH—COCH₃, SO₃H, HO₃S, OH, Cl substituents) | Br—CH₂CH(Br)—C(=O)—Cl | (benzene with NH₂, OH, COOH) | grey |
| 191 | (naphthalene azo phenol with NHCOCH₃, OH, HO₃S, OH, SO₃H, Cl substituents) | " | (benzene with SO₃H, OH, COOH, H₂N) | blue |
| 192 | " | " | (benzene with NH₂, OH, COOH) | greenish blue |
| 193 | (naphthalene azo phenol with NHCOCH₃, OH, SO₃H, HO₃S, OH, NO₂ substituents) | " | (benzene with SO₃H, OH, COOH, H₂N) | greenish grey |

TABLE IV-continued

| Example | I | II | III | IV |
|---|---|---|---|---|
| 194 | " | " | 4-amino-2-hydroxybenzoic acid (NH₂–C₆H₃(OH)–COOH) | greenish blue |
| 195 | 2-hydroxy-4-tert-butyl-2'-hydroxy-3'-sulfo-5'-nitroazobenzene | Br–CH₂–CH(Br)–C(O)–Cl | 4-amino-2-hydroxybenzoic acid | reddish brown |
| 196 | " | " | 5-amino-2-hydroxybenzoic acid | " |
| 197 | " | " | 3-amino-2-hydroxy-5-sulfobenzoic acid | " |

TABLE IV-continued

| Example | I | II | III | IV |
|---|---|---|---|---|
| 198 | " | | aminohydroxybenzoic acid sulfonated (NH₂, OH, COOH, SO₃H) | " |
| 199 | " | ClCO(CH₂)₃SO₂CH₂CH₂Cl | aminodihydroxybenzoic acid sulfonated | |
| 200 | HO-naphthyl-N=N-naphthyl(OH)(SO₃H)(HO₃S) | BrCH₂-CHBr-COCl | aminohydroxybenzoic acid sulfonated | blue |

EXAMPLE 201

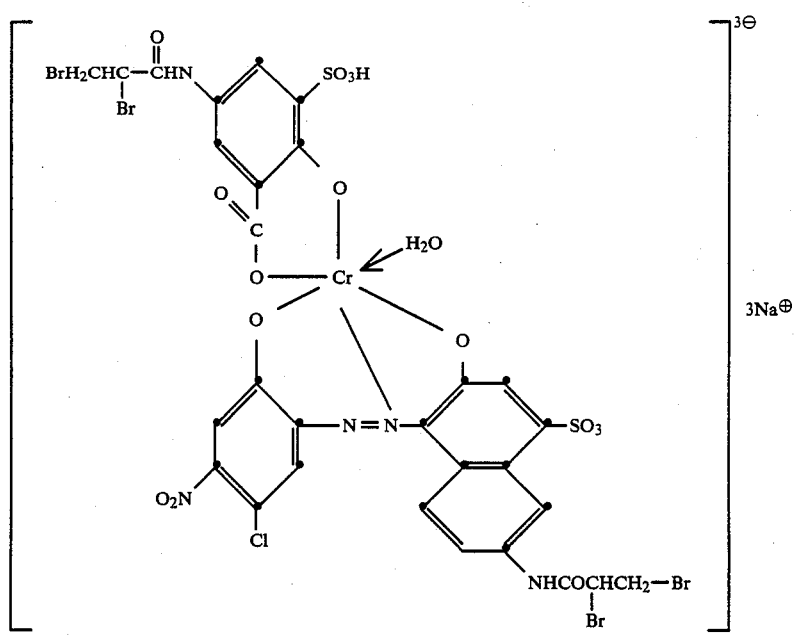

43.9 parts of the 1:1 chromium complex of the monoazo dye obtained by alkaline coupling of 4-chloro-5-nitro-2-aminophenol onto 2-naphthol-6-amino-4-sulfonic acid are suspended in 400 ml of water. 47.6 parts of 2-hydroxy-3-sulfo-5-aminobenzoic acid are added. The suspension is heated to 75°–80° at pH 6.5–6.7, maintained with 2N sodium hydroxide solution, and turns into a solution. The solution is stirred at 75°–80° under constant pH control for 1½ hours. After the adduct formation has ended the temperature is allowed to fall to 20°–25° and 68 parts of dibromopropionyl chloride are added dropwise at 20°–25° in the course of 20–25 minutes; the pH is maintained at 6.5–6.7 with 20% sodium carbonate solution. After the addition has ended the mixture is stirred for 2 hours under constant pH control. The solution of the resulting bis-reactive 1:2 chromium complex is clarified and then evaporated to dryness. The product dyes wool in greyish green shades having good all-round fastness properties.

DYEING EXAMPLE 1

Preparation of the chromium complex of the formula

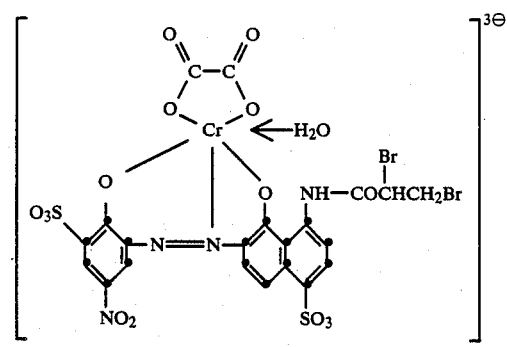

in the dyebath and dyeing at the same time.

10 parts of wool fabric are introduced at 40° into a dyebath which contains, per 340 parts of water, 0.66 part of the 1:1 chromium complex of the formula

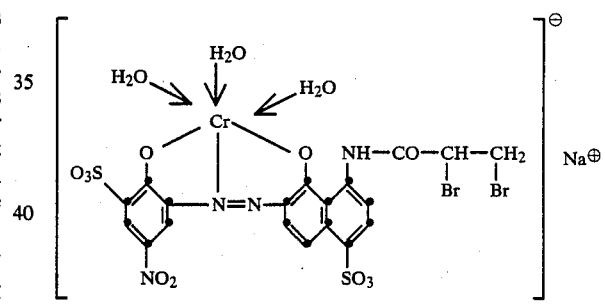

0.66 part of potassium oxalate, 0.4 part of ammonium sulfate, 0.4 part of 80% acetic acid and 0.2 part of a levelling assistant.

The dyebath is raised to 70°–75° in the course of 20 minutes and is then held at that temperature for 30 minutes. It is raised to 100° C. in the course of 15 minutes and is held at that temperature for 90 minutes. The temperature is allowed to fall to 85° in the course of 5 minutes; and the bath is brought to about pH 8.5 with 0.4 part of a 25% ammonia solution. The wool fabric is removed from the liquor after 15 minutes at 85° and is rinsed. It has a level navy colour.

DYEING EXAMPLE 2

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 4000 parts of water at 50°.

4 parts of the dye obtained as described in Example 2 are dissolved in 100 parts of hot water, and this solution is added to the above dyebath. 100 parts of prewetted wool knitting yarn are then entered into the dyebath, and the temperature of the bath is raised from 50° to 80° in the course of 30 minutes. After 20 minutes of dyeing at 80° the dyebath is heated to the boil and dyeing continues at the boil for 90 minutes. Almost all the dye exhausts onto the substrate. After the bath has cooled down to 80° the pH is raised from about 4.5 to a constant pH of 8.5 by adding ammonia solution, and the dyed material is after-treated at this temperature for 20 minutes. Thorough rinsing with hot and cold water, acidifying with 1 part of 80% formic acid, centrifuging and drying produces a dark blue wool yarn of very good wet and rub fastness and excellent light fastness.

DYEING EXAMPLE 3

A wool fabric with an antifelting finish is impregnated with the preparation described hereinafter and is squeezed off on a pad-mangle to a moisture pick-up of 250%:

| | | |
|---|---|---|
| 4 parts | of Diaprint REG (acid-resistant thickener) | |
| 1 part | of sulfamic acid | |
| 0.2 part | of thymene | |
| 0.2 part | of emulsifier | |
| 94.6 parts | of water | |
| 100 parts | | |

The impregnated material is then put into a heatable press together with a transfer paper which bears a print design applied with the dye of Example 3 in conventional manner, and at 100° to 105° is put under a pressure of about 0.5 kg/cm² for 3 minutes. The rinsed and dried wool fabric has a corresponding jet black print design of very good fastness properties.

DYEING EXAMPLE 4

A piece of chlorinated wool flannel is impregnated on a pad-mangle with the preparation of dye described hereinafter and is squeezed off to a liquor pick-up of 100%:

| | |
|---|---|
| 50 parts | of the dye of Example 6 |
| 300 parts | of urea |
| 320 parts | of Solvitose OFA at 4% (thickener) |
| 10 parts | of a mixture of anionic fatty alcohol ether sulfate with nonionic wetting agents |
| 10 parts | of the levelling agent used in Dyeing Example 2 |
| 10 parts | of sodium metabisulfite |
| 10 parts | of 80% acetic acid |
| 290 parts | of water |
| 1000 parts | of padding liquor |

The impregnated fabric is wound into a roll and packed airtight and is stored in this state at room temperature for 48 hours. The material is rinsed with cold water and then treated in a fresh bath with sufficient 24% ammonia to produce pH 8.5 and is held at 80° for 15 minutes. It is rinsed in warm water and finally acidified with 80% acetic acid and dried. The wool fabric has a full black colour of excellent fastness properties.

DYEING EXAMPLE 5

2 parts of the dye obtained in Example 109 are dissolved in 100 parts of water in the presence of 0.5 part of sodium m-nitrobenzenesulfonate. This solution is used to impregnate a cotton fabric in such a way that its weight increases by 75%, and the fabric is then dried.
The fabric is then impregnated with a warm solution at 20° which contains per liter 5 g of sodium hydroxide and 300 g of sodium chloride, the fabric is squeezed off to 75% liquor pick-up and the dyeing is steamed at 100° to 101° for 30 seconds, is rinsed, is soaped in a 0.3% boiling solution of a nonionic detergent for a quarter of an hour, is rinsed and is dried. The cotton fabric has been dyed in a gray shade of excellent fastness properties.

DYEING EXAMPLE 6

2 parts of the dye obtained in Example 112 are dissolved in 100 parts of water. The solution is added to 1900 parts of cold water, 60 parts of sodium chloride are added, and 100 parts of a cotton fabric are introduced into this dyebath. The temperature is raised to 40°, and after 30 minutes 40 parts of calcined sodium carbonate and a further 60 parts of sodium chloride are added. The temperature is maintained at 40° for 30 minutes, and the dyeing is rinsed and then soaped in a 0.3% boiling solution of a nonionic detergent in the course of 15 minutes, is rinsed and is dried.
The result is a cotton fabric in a greenish grey shade having good fastness properties.

DYEING EXAMPLE 7

A piece of chlorinated wool flannel is impregnated on a pad-mangle with the preparation of dye described hereinafter and is squeezed off to a liquor pick-up of 100%:

| | |
|---|---|
| 50 parts | of the dye of Example 48 |
| 300 parts | of Solvitose OFA at 40% (thickener) |
| 20 parts | of a mixture of anionic fatty alcohol ether sulfate with nonionic wetting agents |
| 10 parts | of the levelling agent used in Dyeing Example 2 |
| 20 parts | of 80% acetic acid |
| 600 parts | of water |
| 1000 parts | of padding liquor |

The impregnated fabric is then put into a steamer and is treated with saturated steam for 20 to 40 minutes. The material is rinsed with cold water and is then treated in a fresh bath with sufficient 24% ammonia solution as to produce a pH of 8.5 and is held at 80° for 15 minutes. After rinsing in warm water the fabric is finally acidified with 80% acetic acid and is dried. The wool fabric is in a full black shade of excellent fastness properties.

DYEING EXAMPLE 8

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 1000 parts of water at 50°.
3 parts of the dye obtained in Example 24 are dissolved in 100 parts of hot water, and this solution is added to the above dyebath. A circulation dyeing apparatus is charged with 100 parts of prewetted slubbing on cops, the temperature of the bath is raised from 50° to 97°-99° in the course of 30 minutes, and dyeing then proceeds for 90 minutes at the boil. Almost all the dye exhausts onto the substrate. After the bath has cooled down to 80° it is brought from about pH 4.5 to a constant pH of 8.5 by adding ammonia solution, and the dyed material is after-treated at said temperature. Thorough rinsing with hot and cold water, acidifying with 1 part of 80% formic acid, centrifuging and drying pro-

DYEING EXAMPLE 9

6 parts of 80% acetic acid, 3 parts of the ammonium salt of the acid sulfuric acid ester of the adduct of a fatty amine (comprising 30% hexadecylamine, 25% octadecylamine and 45% octadecenylamine and 7 moles of ethylene oxide) and 6 parts of ammonium sulfate are dissolved in succession in 1000 parts of water at 50°.

3 parts of the dye obtained in Example 2 are dissolved in 100 parts of hot water, and this solution is added to the above dyebath. A circulation dyeing apparatus is charged with 150 parts of prewetted loose wool, the temperature of the liquor is raised from 50° to 97°–99° in the course of 30 minutes, and dyeing then proceeds at the boil for 90 minutes. Almost all the dye exhausts onto the substrate. After the liquor has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produces a level dark blue substrate having good wet and rub fastness and excellent light fastness.

DYEING EXAMPLE 10

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 4000 parts of water at 50°.

0.45 part of the dye obtained in Example 2 and 0.30 part of the yellow dye of the formula

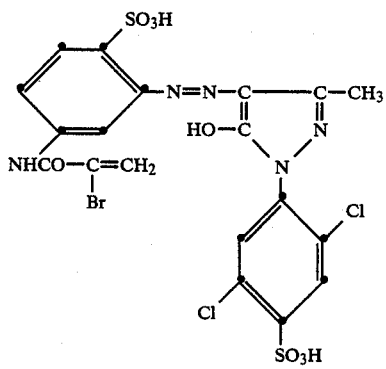

and 0.40 part of the red dye of the formula

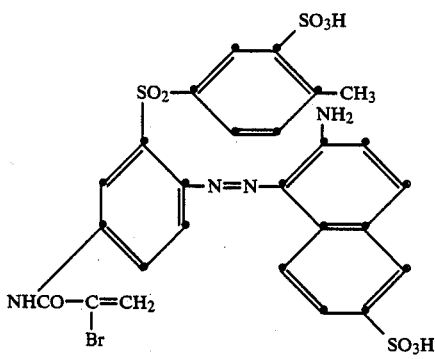

are dissolved in 100 parts of hot water, and this solution is added to the above dyebath. 100 parts of prewetted wool fabric are then introduced into said dyebath, and the temperature of the bath is raised from 50° to 80° in the course of 30 minutes. After 20 minutes of dyeing at 80° the dyebath is heated to the boil, and dyeing then proceeds at the boil for 90 minutes. Almost all the dye exhaust on to the substrate. After the bath has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produces a level dark brown wool fabric having very good wet and rub fastness and excellent light fastness.

DYEING EXAMPLE 11

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved in succession in 1000 parts of water at 50°.

0.6 part of the dye obtained in Example 4 and 0.09 part of the yellow dye of the formula

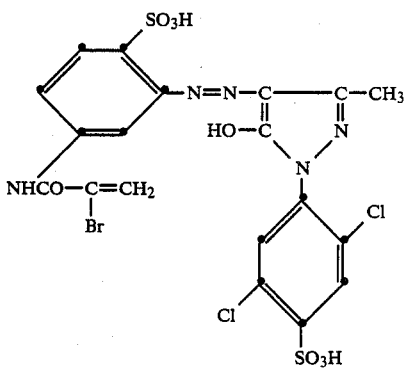

and 0.2 part of the red dye of the formula

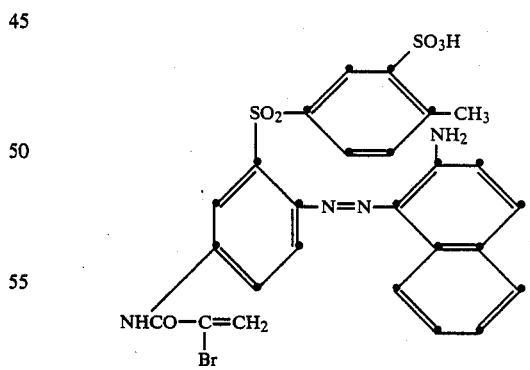

are dissolved in 100 parts of hot water, and this solution is added to the above dyebath. A circulation dyeing apparatus is charged with 100 parts of prewetted slubbing on cops, the temperature of the bath is raised from 50° to 97°–99° in the course of 30 minutes, and dyeing then proceeds at the boil for 90 minutes. Almost all the dye exhausts onto the substrate. After the bath has cooled down to 80° it is brought from about pH 4.5 to a constant pH of 8.5 by adding ammonia solution, and the dyed material is after-treated at said temperature for 20 minutes. Thorough rinsing with hot and cold water, acidifying with 1 part of 80% formic acid, centrifuging and drying produce a grey dyed material having very good wet fastness and excellent light fastness.

DYEING EXAMPLE 12

4 parts of 80% acetic acid, 2 parts of the ammonium salt of the acid sulfuric acid ester of the adduct of a fatty amine (comprising 30% hexadecylamine, 25% octadecylamine, 45% octadecenylamine and 7 moles of ethylene oxide) and 4 parts of ammonium sulfate are dissolved in succession in 4,000 parts of water at 50° C. To this dyebath is added a solution of 2.2 parts of the 1:1 chromium complex dye of the following structure

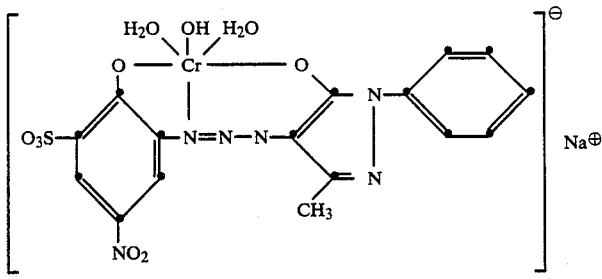

in 100 parts of water at 50° C. plus a solution, in 50 parts of water at 50° C., of 1 part of a compound obtainable in conventional manner by acylating 2-hydroxy-4-aminobenzoic acid with 1,2-dibromopropionyl chloride and having the structure

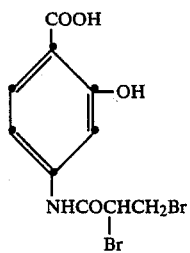

100 parts of prewetted wool knitting yarn are then introduced into the dyebath, and the temperature of the bath is raised from 50° to 80° C. in the course of 30 minutes. After 20 minutes of dyeing at 80° C. the bath is raised to the boil, and dyeing continues at the boil for 90 minutes. At that point the dyebath contains virtually no more dye. After the bath has cooled down to 80° C. it is brought from about pH 4.5 to a constant pH 8.5 by adding ammonia solution, and the dyed material is after-treated at this temperature for 20 minutes. Thorough rinsing with hot and cold water, acidifying with 1 part of 80% formic acid, centrifuging and drying produces a wool yarn dyed in a level orange red of very good wet and rub fastness and excellent light fastness.

Instead of the colourless reactive compound mentioned it is also possible to use in the dyeing procedure described above the analogous products of acylating 2-hydroxy-5-aminobenzoic acid, 2-hydroxy-3-sulfo-5-aminobenzoic acid, 2-hydroxy-3-amino-5-sulfobenzoic acid or 2-hydroxy-4-amino-6-sulfobenzoic acid with 1,2-dibromopropionyl chloride. The resulting yellowish to reddish orange dyeings are distinguished by a high fastness level.

DYEING EXAMPLE 13

8 parts of 96% sulfuric acid and 5 parts of anhydrous sodium sulfate are added to 4,000 parts of water at 70° C. A solution of 4 parts of a 1:1 chromium complex dye of the structure

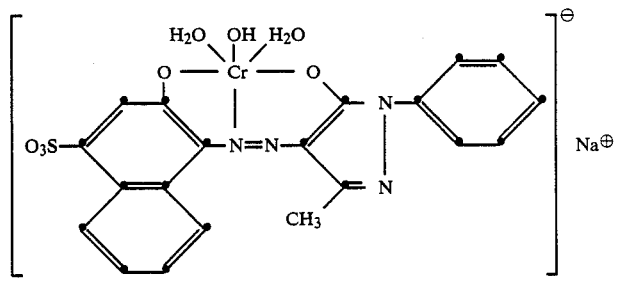

in 100 parts of water is added, followed by 100 parts of prewetted wool fabric. The temperaure of the dyebath is raised to 98°-100° C. in the course of 30 minutes and is maintained there for a further 90 minutes. After cooling down to 80° the fabric, which has been dyed in pink, is thoroughly rinsed in running hot and cold water and is finally centrifuged.

The dyed wool fabric, which is still moist, is then introduced into a dyebath which contains, per 3,000 parts of water at 50° C., 1 part of the colourless compound of the formula

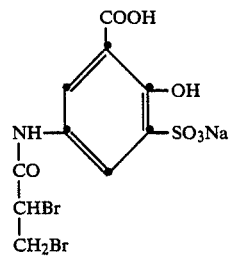

5 parts of 40% acetic acid and 5 parts of crystalline sodium acetate.

The temperature of the dyebath is raised from 50° to 80° C. in the course of 30 minutes. After 20 minutes at 80° the bath is raised to the boil and is then held at the boil for 60 minutes.

After it has cooled down to 80° C. the bath is brought to a constant pH 8.5 by adding ammonia solution, and the dyed material is treated at the same temperature for a further 20 minutes. Rinsing with hot and cold water, acidifying with 1 part of 80% formic acid, renewed rinsing, centrifuging and drying produces a level claret wool fabric having very good wet fastness properties and good light fastness.

We claim:

1. A process for dyeing textile materials with a chromium complex of the formula

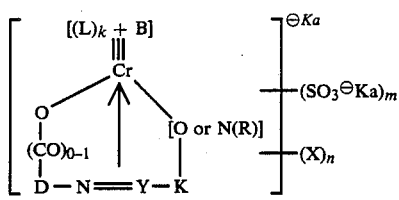

in which B is the radical of salicyclic acid unsubstituted or substituted by sulfo, amino and acetylamino, 1,2-dihydroxybenzene, 3,4,6-trihydroxybenzoic acid, phthalic acid, 1-hydroxynaphthalene-8-carboxylic acid or

HOOC—$R_1$—COOH,

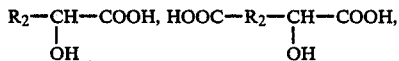
$R_2$—CH—COOH, HOOC—$R_2$—CH—COOH,
      |                        |
      OH                       OH

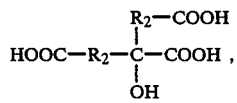
           $R_2$—COOH
           |
HOOC—$R_2$—C—COOH ,
           |
           OH where $R_1$ is the direct bond, $C_{1-2}$-alkylene or —CH═CH—, $R_2$ is $C_{1-4}$-alkyl and $R_1$ and $R_2$ are unsubstituted or substituted by halogen or $C_{1-4}$-alkoxy, L is $H_2O$, $NH_3$, $R_2$—OH, $R_2$—$NH_2$, $(R_2)_2NH$, $(R_2)_3N$ or pyridine, D is benzene or naphthalene, Y is the nitrogen atom or the CH group, K, in the event that Y is the nitrogen atom, including [O or N(R)] is naphthol which is unsubstituted or substituted by halogen, amino, acylamino, acyl, $C_{1-4}$-alkyl, $C_{1-4}$-alkoxy, sulfonamido, N-monosubstituted or N,N-disubstituted sulfonamido, sulfo and sulfonyl; naphthylamine which is unsubstituted or substituted by halogen, $C_{1-4}$-alkyl, $C_{1-4}$-alkoxy, sulfonamido, monosubstituted or disubstituted sulfonamido, sulfo or sulfonyl; 5-pyrazolones or 5-aminopyrazoles which have in the 1-position phenyl or naphthyl which are unsubstituted or substituted by halogen, nitro, $C_{1-4}$-alkyl, $C_{1-4}$-alkoxy, sulfonamido, N-alkylated sulfonamido, sulfo, sulfonyl and amino; 2,6-dihydroxy-3-cyano- or -3-carboxamido-4-alkylpyridines or 6-hydroxy-2-pyridones which are substituted in the 1-position by $C_{1-4}$-alkyl or $C_{1-4}$-alkyl substituted by hydroxy, amino or isopropoxy, or the 1-position is substituted by —$NH_2$, —$N(CH_3)_2$ or —$N(C_2H_5)_2$ and which carry —CN or carboxamido in the 3-position and $C_{1-4}$-alkyl in the 4-position; acetoacetanilides or benzoylacetanilides which are unsubstituted or substituted by $C_{1-4}$-alkyl, $C_{1-4}$-alkoxy, $C_{1-4}$-alkylsulfonyl, $C_{1-4}$-hydroxyalkyl, $C_{1-4}$-alkoxyalkyl, $C_{1-4}$-cyanoalkylsulfonyl, sulfonamido, N-alkylated sulfonamido, sulfo, acetylamino and halogen; phenols which are substituted by $C_{1-5}$-acylamino or $C_{1-5}$-alkyl or $C_{1-5}$-acylamino and $C_{1-5}$-alkyl, and hydroxyphenols; quinolones; or in the event that Y is the CH group K including [O or N(R)] is o-hydroxybenzaldehyde or o-hydroxynaphthaldehyde, and D and K independently of each other are unsubstituted or substituted by $C_{1-5}$-alkyl, $C_{1-4}$-alkoxy, acylamino having 1 to 6 carbon atoms, benzoylamino, amino, monoalkylamino or dialkylamino each having 1 to 4 carbon atoms, phenylamino, alkoxycarbonyl having 1 to 4 carbon atoms in the alkoxy radical, nitro, cyano, trifluoromethyl, halogen, sulfamoyl, carbamoyl, ureido, hydroxy, $C_{1-4}$-alkylsulfonyl, carboxyl, sulfomethyl, phenylazo or naphthylazo, and D and K contain the —(CO)$_{0-1}$—O— and —[O or N(R)]— adjacent to the —N═Y— and R is hydrogen, $C_{1-4}$-alkyl or phenyl, Ka is a cation, X is acryloyl, monohalogenoacryloyl, dihalogenoacryloyl, trihalogenoacryloyl, monohalogenomethacryloyl, dihalogenomethacryloyl, trihalogenomethacryloyl, monohalogenopropionyl, dihalogenopropionyl, phenylsulfonylpropionyl, methylsulfonylpropionyl, vinylsulfonyl, β-chloroethylsulfonyl, β-sulfatoethylsulfonyl, monohalogenopyrimidyl, dihalogenopyrimidyl, trihalogenopyrimidyl, monohalogenotriazinyl, dihalogenotriazinyl, X is bonded to D, K or B, D and K, D and B or K and B directly or via

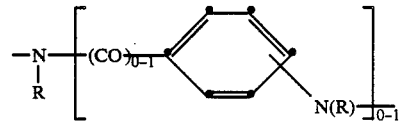

or —$CH_2$—N(R)—, m is 1, 2 or 3, n is 1 or 2 and k is 0 or 1, which comprises using an aqueous liquor which contains compound B, the 1:1 chromium complex of the formula

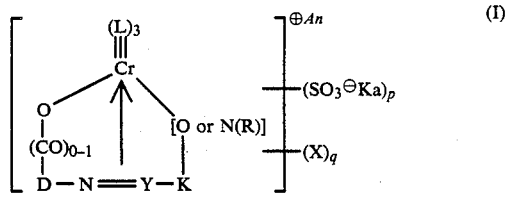

in which D, K, Ka, L, R and X are defined as above, p is 0 to 3, q is 0 to 2 and An is an anion, and the textile material can, if desired, also contain further additives, heating the liquor to 100° C. in continuous or stepwise fashion and then bringing it to an alkaline pH, and completing the dyeing, and wherein if p is 0 the compound B contains at least one $SO_3^{\ominus}Ka$ group and if q is 0 at least one fibre reactive radical X.

2. A process according to claim 1, wherein the compound B and the 1:1 chromium complex of the formula (I) are used in a molar ratio of 2:1 to 1:1.

3. A process according to claim 1, wherein the dyeing liquor which contains the components indicated in claim 1 is raised to 60° to 80° C. in the course of 10 to 45 minutes, is held at said temperature for 10 to 45 minutes, is then raised to 100° C. in the course of 10 to 30 minutes, is maintained at said temperature for 30 to 90 minutes, is cooled down to 85° C., is brought to pH 8-9 and is used for dyeing at 85° C. for a further 10 to 30 minutes.

4. A process according to claim 1, wherein use is made of an aqueous liquor which contains oxalic acid, malonic acid, citric acid, malic acid, tartaric acid, pyrocatechol, phthalic acid, lactic acid or salicylic acid as compound B and the 1:1 chromium complex of the formula

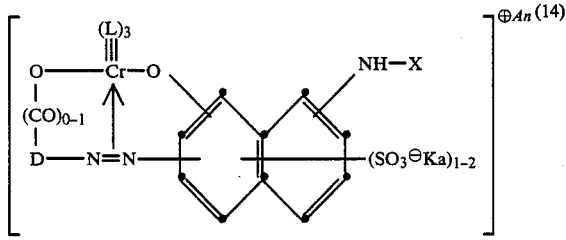

in which L, Ka and An are as defined in claim 1, D is a benzene radical which, in addition to being substituted by the —(CO)—O— group, which is bonded to D in the o-position relative to the azo group, can also be additonally substituted by sulfo, nitro, sulfamoyl and methoxy, or is a naphthalene radical which, in addition to being substituted by the —(C=O)$_{0-1}$—O group, which is bonded to D in the o-position relative to the azo group, can also be additionally substituted by sulfo and nitro, the azo bridge is bonded to the naphthalene nucleus in the o-position relative to the —O— radical, and X is α,β-dibromopropionyl or α-bromoacryloyl.

5. A process according to claim 4, wherein oxalic acid is used as compound B.

6. A process according to claim 1, wherein use is made of an aqueous liquor which contains an unsubstituted or sulfo-substituted α,β-dibromopropionylaminosalicylic acid or α-bromacryloylaminosalicylic acid as compound B and the 1:1 chromium complex of the formula

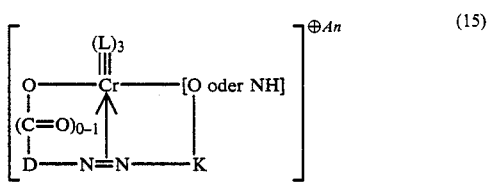

in which L is water, D is a benzene or naphthalene radical which can be substituted by sulfo, nitro and halogen, K is a 1-phenyl-3-methylpyrazol-5-one radical which can be substituted by sulfo or halogen, an acetoacetanilide radical, a naphthalene radical which can be substituted by sulfo or a phenyl radical which is substituted by $C_{1-5}$-alkyl, the azo bridge is bonded to D and K in positions adjacent to the —(C=O)—O— and [O or NH] radicals, and An is as defined in claim 1.

7. A process according to claim 1, wherein the liquor contains as further additives an inorganic or organic acid and an alkali metal or ammonium salt, and can, if desired, also contain a levelling agent.

8. A process according to claim 1, wherein the textile materials are made of synthetic or natural polyamide.

9. A process according to claim 7 wherein the organic acid is acetic acid.

* * * * *